(12) United States Patent
Kanao et al.

(10) Patent No.: US 11,836,458 B2
(45) Date of Patent: Dec. 5, 2023

(54) CALCULATING DEVICE

(71) Applicant: KABUSHIKI KAISHA TOSHIBA, Tokyo (JP)

(72) Inventors: Taro Kanao, Kawasaki Kanagawa (JP); Hayato Goto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 737 days.

(21) Appl. No.: 17/012,716

(22) Filed: Sep. 4, 2020

(65) Prior Publication Data

US 2021/0263705 A1 Aug. 26, 2021

(30) Foreign Application Priority Data

Feb. 21, 2020 (JP) ................................ 2020-028217

(51) Int. Cl.
*G06F 7/38* (2006.01)
*G06N 10/00* (2022.01)

(52) U.S. Cl.
CPC ............. *G06F 7/381* (2013.01); *G06N 10/00* (2019.01)

(58) Field of Classification Search
CPC ...................................................... G06F 7/381
USPC ......................................................... 331/94.1
See application file for complete search history.

(56) References Cited

U.S. PATENT DOCUMENTS

| 10,262,276 B2* | 4/2019 | Puri ......................... G06N 5/01 |
| 2015/0349780 A1* | 12/2015 | Naaman ............. H03K 19/1958 |
| | | 326/5 |
| 2017/0104493 A1* | 4/2017 | Goto ....................... G06N 10/00 |
| 2018/0358539 A1* | 12/2018 | Goto .......................... H03L 7/26 |

(Continued)

FOREIGN PATENT DOCUMENTS

| JP | 6530326 B2 | 6/2019 |
| JP | 2020-136627 A | 8/2020 |

OTHER PUBLICATIONS

Goto, "Bifurcation-based adiabatic quantum computation with a nonlinear oscillator network," Scientific Reports (Feb. 22, 2016), 6:21686, pp. 1-8.

(Continued)

*Primary Examiner* — Joseph Chang
(74) *Attorney, Agent, or Firm* — Finnegan, Henderson, Farabow, Garrett & Dunner, LLP

(57) ABSTRACT

According to one embodiment, a calculating device includes nonlinear oscillators, connectors, and a controller. One of the connectors connects at least two of the nonlinear oscillators. The nonlinear oscillators include first and second nonlinear oscillators. The first nonlinear oscillator includes a first circuit part and a first conductive member. The first circuit part includes first and second Josephson junctions. The second nonlinear oscillator includes a second circuit part and a second conductive member. The second circuit part includes third and fourth Josephson junctions. Numbers of the connectors connected to the first and second connectors are first and second numbers, respectively. The second number is greater than the first number. The controller performs at least a first operation of supplying a first signal to the first conductive member and supplying a second signal to the second conductive member. The second signal is different from the first signal.

20 Claims, 11 Drawing Sheets

(56) References Cited

U.S. PATENT DOCUMENTS

2021/0201188 A1* 7/2021 Yamaji ................. H03B 15/003
2022/0263468 A1* 8/2022 Yamamoto ........... H03B 15/003

OTHER PUBLICATIONS

Puri et al., "Quantum annealing with all-to-all connected nonlinear oscillators," Nature Communications (Jun. 8, 2017), 8:15785, pp. 1-9.

Zhao et al., "Two-Photon Driven Kerr Resonator for Quantum Annealing with Three-Dimensional Circui QED," Physical Review Applied (2018), 10:024019-1-16.

Lechner et al., "A quantum annealing architecture with all-to-all connectivity from local interactions," Sci. Adv. (Oct. 23, 2015), 1:e1500838, 5 pages.

Kanao et al., "High-accuracy Ising machine using Kerr-nonlinear parametric oscillators with local four-body interactions," arXiv:2005.13819v1 (May 28, 2020), pp. 1-9.

* cited by examiner

CALCULATING DEVICE

CROSS-REFERENCE TO RELATED APPLICATIONS

This application is based upon and claims the benefit of priority from Japanese Patent Application No. 2020-028217, filed on Feb. 21, 2020; the entire contents of which are incorporated herein by reference.

FIELD

Embodiments of the invention generally relate to a calculating device.

BACKGROUND

For example, a calculating device that utilizes multiple quantum nonlinear oscillators has been proposed. It is desirable to increase the calculation accuracy of the calculating device.

DETAILED DESCRIPTION

Figure 1:
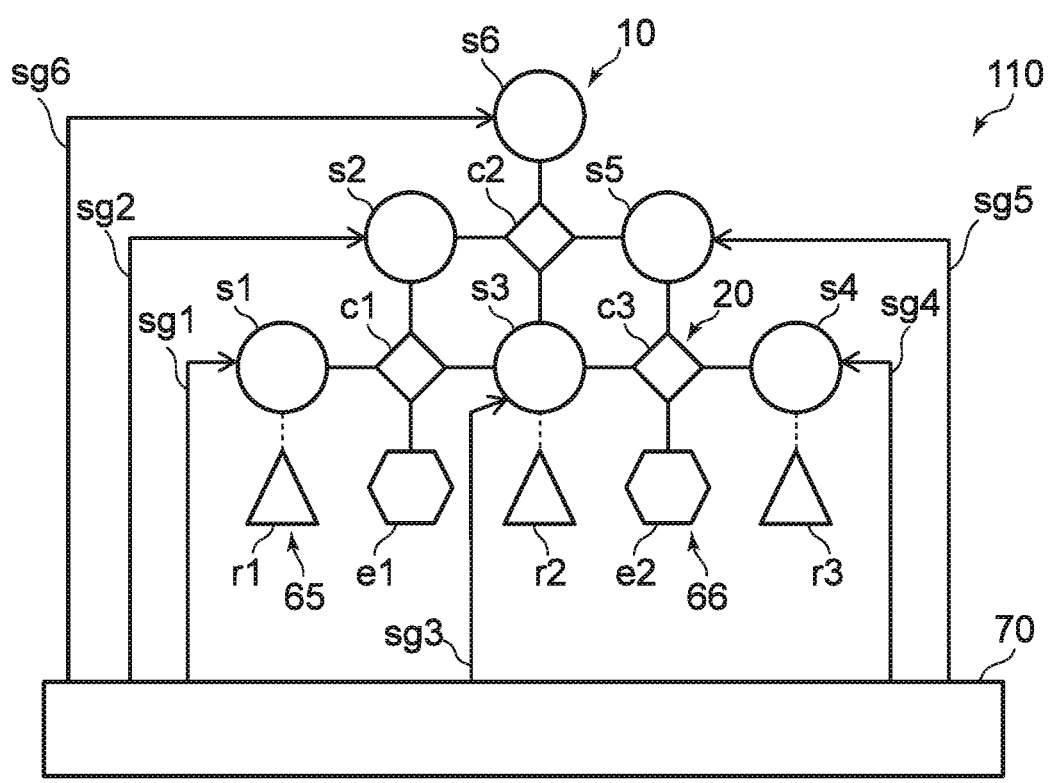
FIG. 1 is a schematic view illustrating a calculating device according to a first embodiment.

According to one embodiment, a calculating device includes a plurality of nonlinear oscillators, a plurality of connectors, and a controller. One of the connectors connects at least two of the nonlinear oscillators. The nonlinear oscillators include a first nonlinear oscillator and a second nonlinear oscillator. The first nonlinear oscillator includes a first circuit part and a first conductive member. The first circuit part includes a first Josephson junction and a second Josephson junction. The second nonlinear oscillator includes a second circuit part and a second conductive member. The second circuit part includes a third Josephson junction and a fourth Josephson junction. A number of the connectors connected to the first nonlinear oscillator is a first number. A number of the connectors connected to the second nonlinear oscillator is a second number. The second number is greater than the first number. In a first period, the controller is configured to perform at least a first operation of supplying a first signal to the first conductive member and supplying a second signal to the second conductive member. The second signal is different from the first signal. In the first period, the controller sets the first and second signals to cause an absolute value of $(p_2-\Delta_2)/K_2$ to be less than an absolute value of $(p_1-\Delta_1)/K_1$. $\rho_1$ is an amount proportional to an amplitude of an alternating current component of a signal of the first nonlinear oscillator. $\Delta_1$ is a difference between a resonant frequency of the first nonlinear oscillator and ½ of a frequency of the first signal. $K_1$ is an anharmonicity of the first nonlinear oscillator. $p_2$ is an amount proportional to an amplitude of an alternating current component of a signal of the second nonlinear oscillator. $\Delta_2$ is a difference between a resonant frequency of the second nonlinear oscillator and ½ of a frequency of the second signal. $K_2$ is an anharmonicity of the second nonlinear oscillator.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic view illustrating a calculating device according to a first embodiment.

As shown in FIG. 1, the calculating device 110 according to the embodiment includes multiple nonlinear oscillators 10, multiple connectors 20, and a controller 70. The circular symbols in FIG. 1 correspond to the multiple nonlinear oscillators 10. The rhombus-shaped symbols in FIG. 1 correspond to the multiple connectors 20.

In the example, the multiple nonlinear oscillators 10 include first to sixth nonlinear oscillators s1 to s6. In the example, the multiple connectors 20 include first to third connectors c1 to c3.

One of the multiple connectors 20 connects at least two of the multiple nonlinear oscillators 10. The connection includes, for example, a capacitance connection. In the example, the first connector c1 connects the first nonlinear oscillator s1, the second nonlinear oscillator s2, and the third nonlinear oscillator s3. The second connector c2 connects the second nonlinear oscillator s2, the third nonlinear oscillator s3, the fifth nonlinear oscillator s5, and the sixth nonlinear oscillator s6. The third connector c3 connects the third nonlinear oscillator s3, the fourth nonlinear oscillator s4, and the fifth nonlinear oscillator s5.

In the example, the calculating device 110 includes readers 65. The triangular symbols in FIG. 1 correspond to the readers 65. The readers 65 include, for example, readers r1, r2, and r3. For example, the reader r1 can read the state of the first nonlinear oscillator s1. For example, the reader r2 can read the state of the third nonlinear oscillator s3. For example, the reader r3 can read the state of the fourth nonlinear oscillator s4.

In the example, the calculating device 110 includes terminal parts 66. The hexagonal symbols in FIG. 1 correspond to the terminal parts 66. The terminal parts 66 include, for example, terminal parts e1 and e2. For example, the terminal part e1 is connected to the first connector c1. The terminal part e2 is connected to the third connector c3.

The controller 70 supplies signals to the multiple nonlinear oscillators 10. For example, the controller 70 supplies a first signal sg1 to the first nonlinear oscillator s1. The controller 70 supplies a second signal sg2 to the second nonlinear oscillator s2. The controller 70 supplies a third signal sg3 to the third nonlinear oscillator s3. The controller 70 supplies a fourth signal sg4 to the fourth nonlinear oscillator s4. The controller 70 supplies a fifth signal sg5 to the fifth nonlinear oscillator s5. The controller 70 supplies a sixth signal sg6 to the sixth nonlinear oscillator s6.

FIGS. 2A to 2G are schematic views illustrating portions of the calculating device according to the first embodiment.

Figure 2A:
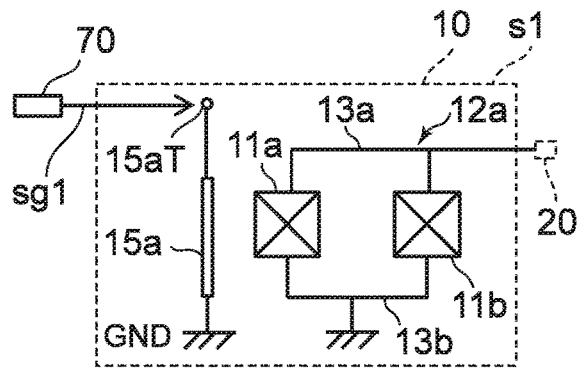
FIGS. 2A to 2G are schematic views illustrating portions of the calculating device according to the first embodiment.

For example, as shown in FIG. 2A, the first nonlinear oscillator s1 includes a first conductive member 15a, and a first circuit part 12a that includes a first Josephson junction 11a and a second Josephson junction 11b. The first Josephson junction 11a and the second Josephson junction 11b are connected by a first conductive portion 13a and a second conductive portion 13b. The first circuit part 12a is formed of the first Josephson junction 11a, the second Josephson junction 11b, the first conductive portion 13a, and the second conductive portion 13b. For example, the first signal sg1 is supplied from the controller 70 to the first conductive member 15a. For example, the first signal sg1 is input to a portion 15aT of the first conductive member 15a. Another portion of the first conductive member 15a is connected to a ground portion GND. For example, a current flows in the first conductive member 15a based on the first signal sg1, which is alternating current. An electromagnetic wave that is based on the current is applied to the first circuit part 12a. The first circuit part 12a is connected to any of the multiple connectors 20.

Figure 2B:
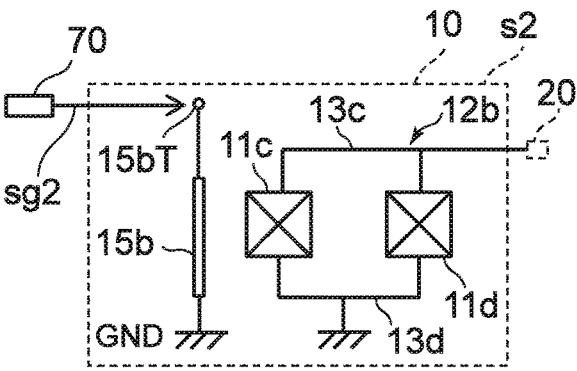

For example, as shown in FIG. 2B, the second nonlinear oscillator s2 includes a second conductive member 15b, and a second circuit part 12b that includes a third Josephson junction 11c and a fourth Josephson junction 11d. The third Josephson junction 11c and the fourth Josephson junction 11d are connected by a third conductive portion 13c and a fourth conductive portion 13d. The second circuit part 12b is formed of the third Josephson junction 11c, the fourth Josephson junction 11d, the third conductive portion 13c, and the fourth conductive portion 13d. For example, the second signal sg2 is supplied from the controller 70 to the second conductive member 15b. For example, the second signal sg2 is input to a portion 15bT of the second conductive member 15b. Another portion of the second conductive member 15b is connected to the ground portion GND. For example, a current flows in the second conductive member 15b based on the second signal sg2, which is alternating current. An electromagnetic wave that is based on the current is applied to the second circuit part 12b. The second circuit part 12b is connected to any of the multiple connectors 20.

Figure 2C:
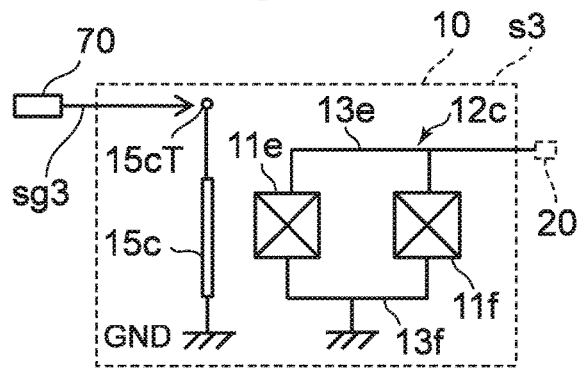

For example, as shown in FIG. 2C, the third nonlinear oscillator s3 includes a third conductive member 15c, and a third circuit part 12c that includes a fifth Josephson junction 11e and a sixth Josephson junction 11f. The fifth Josephson junction 11e and the sixth Josephson junction 11f are connected by a fifth conductive portion 13e and a sixth conductive portion 13f. The third circuit part 12c is formed of the fifth Josephson junction 11e, the sixth Josephson junction 11f, the fifth conductive portion 13e, and the sixth conductive portion 13f. For example, the third signal sg3 is supplied from the controller 70 to the third conductive member 15c. For example, the third signal sg3 is input to a portion 15cT of the third conductive member 15c. Another portion of the third conductive member 15c is connected to the ground portion GND. For example, a current flows in the third conductive member 15c based on the third signal sg3, which is alternating current. An electromagnetic wave that is based on the current is applied to the third circuit part 12c. The third circuit part 12c is connected to any of the multiple connectors 20.

Figure 2D:
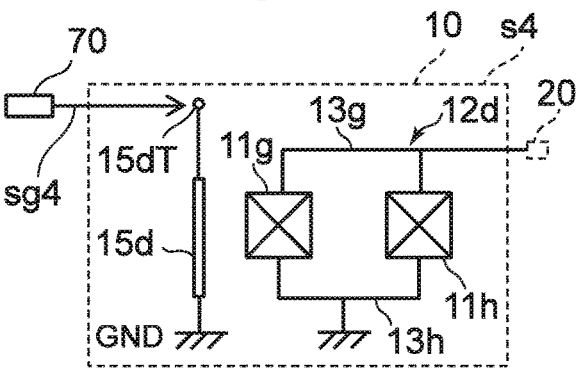

Similarly, as shown in FIG. 2D, the fourth nonlinear oscillator s4 includes a fourth conductive member 15d, and a fourth circuit part 12d that includes a seventh Josephson junction 11g and an eighth Josephson junction 11h. The fourth circuit part 12d includes a seventh conductive portion 13g and an eighth conductive portion 13h that connect these Josephson junctions. The fourth signal sg4 is supplied from the controller 70 to the fourth conductive member 15d. An electromagnetic wave that is based on the fourth signal sg4, which is alternating current, is applied to the fourth circuit part 12d. The fourth circuit part 12d is connected to any of the multiple connectors 20.

Figure 2E:
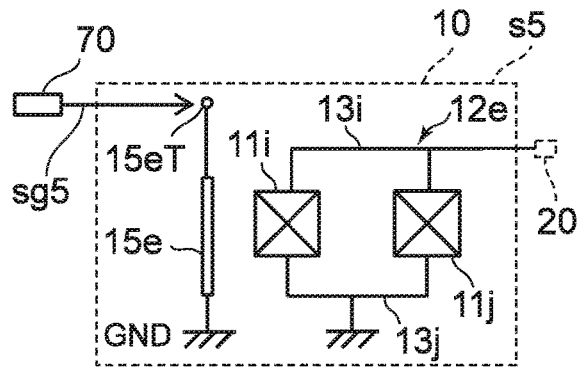

Similarly, as shown in FIG. 2E, the fifth nonlinear oscillator s5 includes a fifth conductive member 15e, and a fifth circuit part 12e that includes a ninth Josephson junction 11i and a tenth Josephson junction 11j. The fifth circuit part 12e includes a ninth conductive portion 13i and a tenth conductive portion 13j that connect these Josephson junctions. The fifth signal sg5 is supplied from the controller 70 to the fifth conductive member 15e. An electromagnetic wave that is based on the fifth signal sg5, which is alternating current, is applied to the fifth circuit part 12e. The fifth circuit part 12e is connected to any of the multiple connectors 20.

Figure 2F:
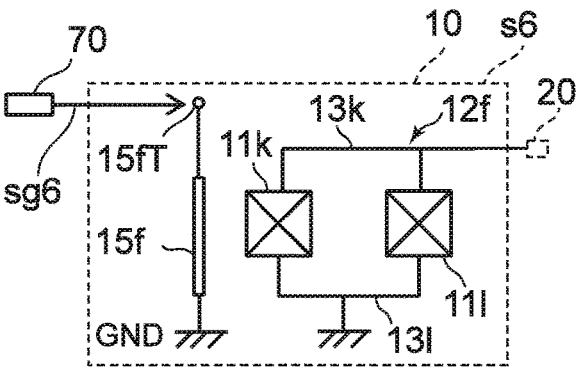

Similarly, as shown in FIG. 2F, the sixth nonlinear oscillator s6 includes a sixth conductive member 15f, and a sixth circuit part 12f that includes an eleventh Josephson junction 11k and a twelfth Josephson junction 11l. The sixth circuit part 12f includes an eleventh conductive portion 13k and a twelfth conductive portion 13l that connect these Josephson junctions. The sixth signal sg6 is supplied from the controller 70 to the sixth conductive member 15f. An electromagnetic wave that is based on the sixth signal sg6, which is alternating current, is applied to the sixth circuit part 12f. The sixth circuit part 12f is connected to any of the multiple connectors 20.

Figure 2G:
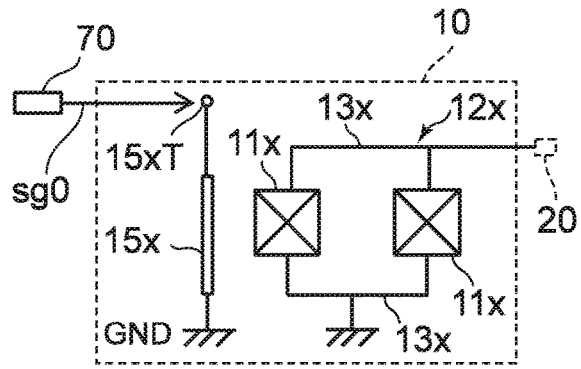

As shown in FIG. 2G, one of the multiple nonlinear oscillators 10 includes a conductive member 15x, and a circuit part 12x that includes multiple Josephson junctions 11x. For example, the multiple Josephson junctions 11x are connected by a conductive portion 13x. The circuit part 12x is formed of the multiple Josephson junctions 11x and the conductive portion 13x. The conductive member 15x is provided at the vicinity of the circuit part 12x. For example, a signal sg0 is supplied from the controller 70 to the conductive member 15x. For example, the signal sg0 is input to a portion 15xT of the conductive member 15x. Another portion of the conductive member 15x is connected to the ground portion GND. For example, a current flows in the conductive member 15x based on the signal sg0, which is alternating current. An electromagnetic wave that is based on the current is applied to the circuit part 12x. The circuit part 12x is connected to any of the multiple connectors 20.

Figure 3:
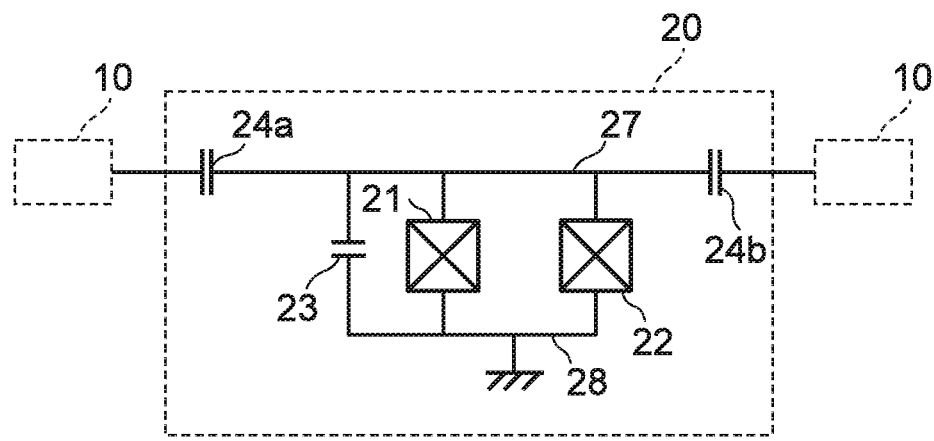
FIG. 3 is a schematic view illustrating a portion of the calculating device according to the first embodiment.

FIG. 3 is a schematic view illustrating a portion of the calculating device according to the first embodiment.

FIG. 3 shows one example of the multiple connectors 20. As shown in FIG. 3, the connector 20 includes a Josephson junction 21, a Josephson junction 22, and a capacitance 23. For example, a circuit is formed by connecting the Josephson junction 21, the Josephson junction 22, and the capacitance 23 in parallel by wiring 27 and wiring 28. A portion of the circuit is connected to one of the multiple nonlinear oscillators 10 via a capacitance 24a. Another portion of the circuit is connected to another one of the multiple nonlinear oscillators 10 via a capacitance 24b.

Figure 4:
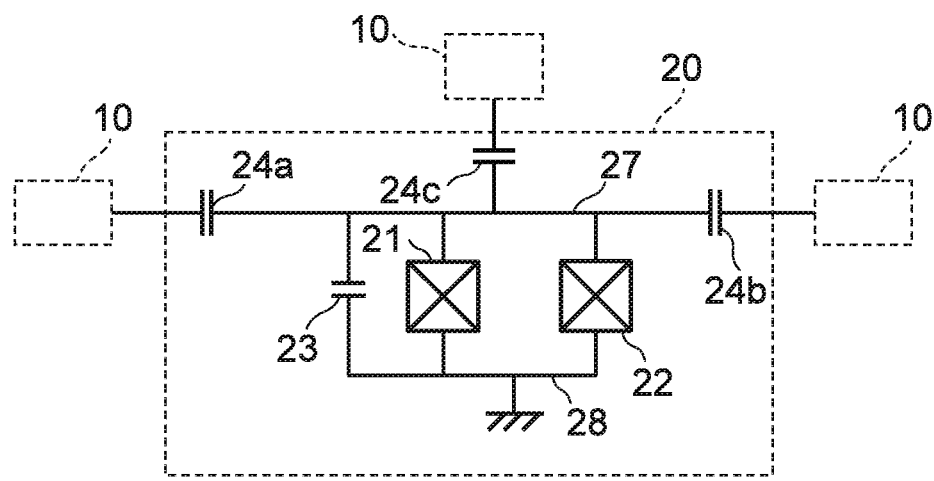
FIG. 4 is a schematic view illustrating a portion of the calculating device according to the first embodiment.

FIG. 4 is a schematic view illustrating a portion of the calculating device according to the first embodiment.

FIG. 4 shows one example of the multiple connectors 20. In the example as shown in FIG. 4, a portion of the circuit included in the connector 20 is connected to one of the multiple nonlinear oscillators 10 via the capacitance 24a. Another portion of the circuit is connected to another one of the multiple nonlinear oscillators 10 via the capacitance 24b. Yet another portion of the circuit is connected to another one of the multiple nonlinear oscillators 10 via a capacitance 24c.

Figure 5:
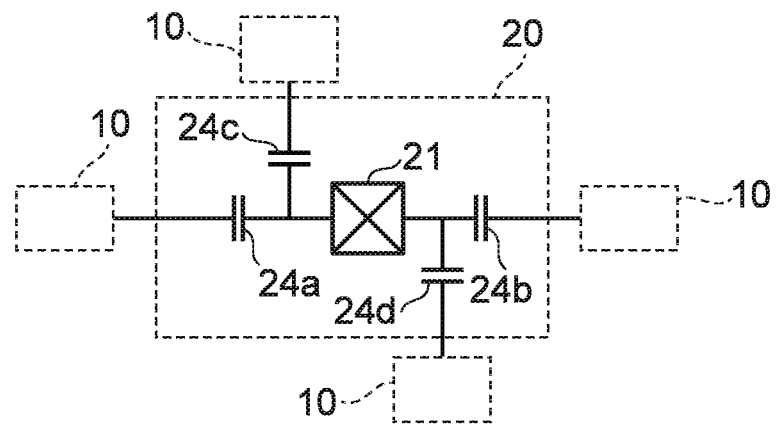
FIG. 5 is a schematic view illustrating a portion of the calculating device according to the first embodiment.

FIG. 5 is a schematic view illustrating a portion of the calculating device according to the first embodiment.

FIG. 5 shows one example of the multiple connectors 20. In the example as shown in FIG. 5, one of the multiple connectors 20 includes the Josephson junction 21 and capacitances 24a to 24d. For example, the Josephson junction 21 is connected to one of the multiple nonlinear oscillators 10 via the capacitance 24a. The Josephson junction 21 is connected to another one of the multiple nonlinear oscillators 10 via the capacitance 24b. The Josephson junction 21 is connected to another one of the multiple nonlinear oscillators 10 via the capacitance 24c. The Josephson junction 21 is connected to another one of the multiple nonlinear oscillators 10 via the capacitance 24d.

Figure 6:
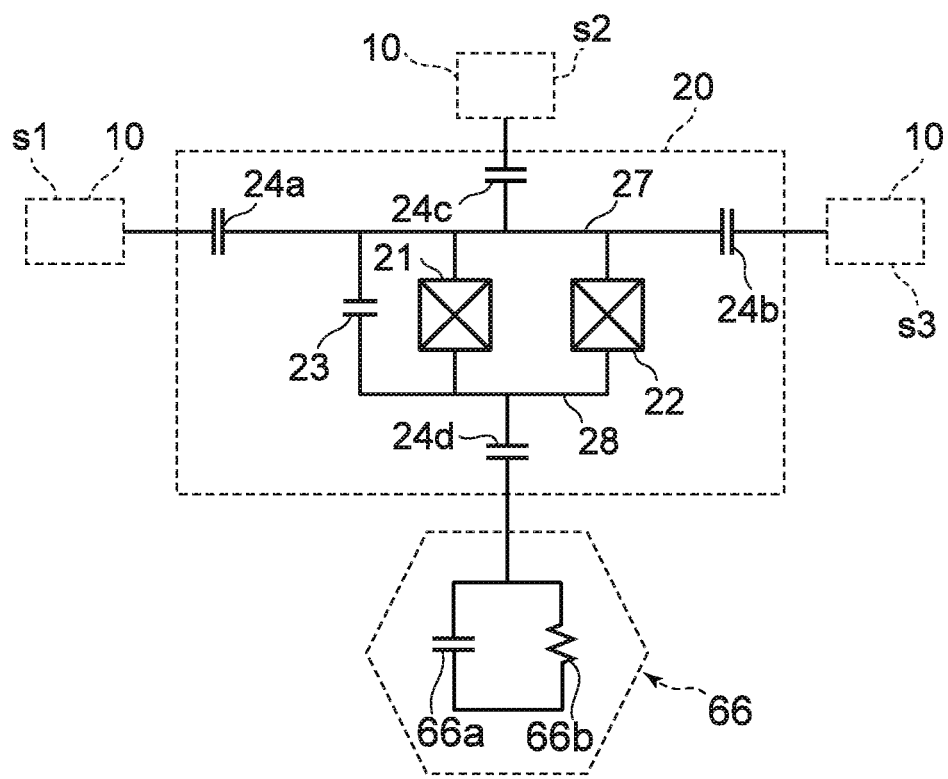
FIG. 6 is a schematic view illustrating a portion of the calculating device according to the first embodiment.

FIG. 6 is a schematic view illustrating a portion of the calculating device according to the first embodiment.

FIG. 6 shows one example of the terminal part 66. In the example as shown in FIG. 6, the terminal part 66 includes a capacitance 66a and a resistance 66b. The capacitance 66a and the resistance 66b are electrically connected in parallel. In the example, the connector 20 is connected to the terminal part 66 via the capacitance 24d.

For example, the multiple nonlinear oscillators 10 correspond to a Kerr parametric oscillator (KPO). For example, the number of KPOs that are caused to interact corresponds to the number of variables of the "problem" to be calculated by the calculator. Neighbor interactions in a two-dimensional plane are employed as a network in which the multiple KPOs interact. Such a network is formed of a superconducting quantum circuit including the multiple KPOs.

As shown in FIG. 1, the network is formed by connecting the multiple nonlinear oscillators 10 with the multiple connectors 20. As shown in FIG. 1, the number of the connectors 20 connected to the nonlinear oscillator 10 is different according to the position of the nonlinear oscillator 10 in the network.

For example, the number of the multiple connectors 20 connected to the first nonlinear oscillator s1 is taken as a first number. In the example of FIG. 1, the first connector c1 is connected to the first nonlinear oscillator s1. Accordingly, the first number is 1.

For example, the number of the multiple connectors 20 connected to the second nonlinear oscillator s2 is taken as a second number. In the example of FIG. 1, the first connector c1 and the second connector c2 are connected to the second nonlinear oscillator s2. Accordingly, the second number is 2.

For example, the number of the multiple connectors 20 connected to the third nonlinear oscillator s3 is taken as a third number. In the example of FIG. 1, the first connector c1, the second connector c2, and the third connector c3 are connected to the third nonlinear oscillator s3. Accordingly, the third number is 3.

For example, the number (a fourth number) of the multiple connectors 20 connected to the fourth nonlinear oscillator s4 is 1. For example, the number (a fifth number) of the multiple connectors 20 connected to the fifth nonlinear oscillator s5 is 2. For example, the number (a sixth number) of the multiple connectors 20 connected to the sixth nonlinear oscillator s6 is 1.

Thus, the number of the multiple connectors 20 that are connected is different between the multiple nonlinear oscillators 10.

In the calculating device 110 according to the embodiment, an operation of controlling the signal supplied to each of the multiple nonlinear oscillators 10 is performed according to the difference between the numbers of the multiple connectors 20 that are connected.

In one example, the number of the multiple connectors 20 connected to the first nonlinear oscillator s1 is taken as a first number $z_1$. The number of the multiple connectors 20 connected to the second nonlinear oscillator s2 is taken as a second number $z_2$. For example, the second number $z_2$ is greater than the first number $z_1$. The controller 70 performs a first operation in at least a portion of the calculation period (a first period). In the first operation, the controller 70 supplies the first signal sg1 to the first conductive member 15a and supplies the second signal sg2 to the second conductive member 15b. The second signal sg2 is different from the first signal sg1. For example, the second signal sg2 includes at least one of the frequency of the alternating current component of the second signal sg2 being different from the frequency of the alternating current component of the first signal sg1, the magnitude of the direct current component of the second signal sg2 being different from the magnitude of the direct current component of the first signal sg1, or the amplitude of the alternating current component of the second signal sg2 being different from the amplitude of the alternating current component of the first signal sg1.

In the embodiment, the controller 70 changes the signals according to the number of the multiple connectors 20 that are connected. Thereby, for example, it was found that the problem can be accurately solved even when there is fluctuation of the characteristics of the multiple nonlinear oscillators 10.

An example of simulation results of calculation results when changing the signals according to the number of the multiple connectors 20 that are connected will now be described.

Figure 7:
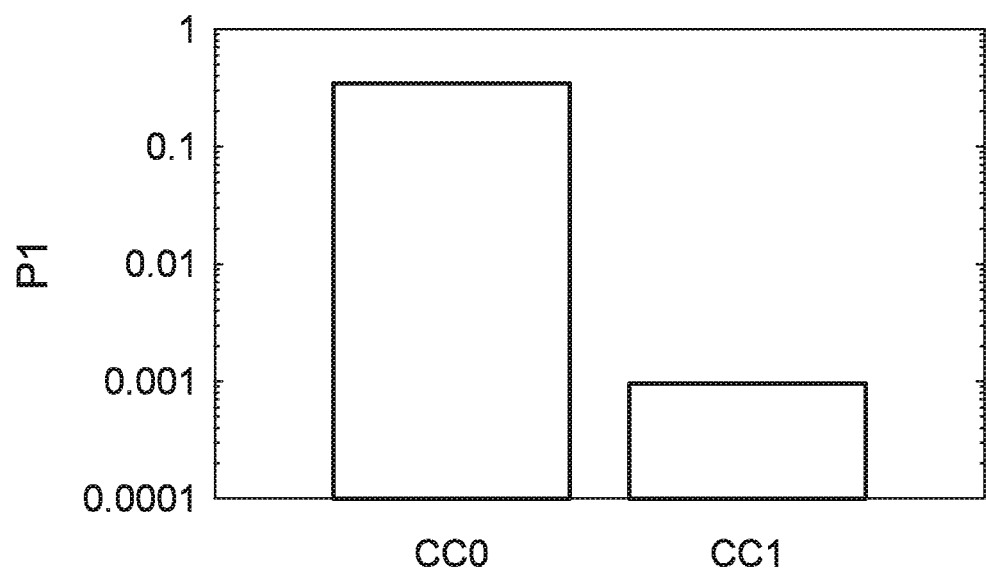
FIG. 7 is a graph illustrating the calculation results.

FIG. 7 is a graph illustrating the calculation results.

FIG. 7 shows an example of simulation results of calculation results when one problem is solved using different calculation conditions.

In FIG. 7, the vertical axis is a failure probability P1 of the calculation. The failure probability P1 is displayed logarithmically. A failure is when the problem could not be accurately solved in the calculation. FIG. 7 shows the result of a reference calculation condition CC0 and the result of a first calculation condition CC1. For the reference calculation condition CC0, the same signal is supplied to all of the multiple nonlinear oscillators 10 (the first to sixth nonlinear oscillators s1 to s6) in the configuration illustrated in FIG. 1. For the first calculation condition CC1, the frequency of the alternating current component of the signal supplied to the nonlinear oscillator 10 having a large number of the multiple connectors 20 connected is greater than the frequency of the alternating current component of the signal supplied to another nonlinear oscillator 10 having a small number of the multiple connectors 20 connected.

As shown in FIG. 7, compared to the reference calculation condition CC0, the failure probability is low for the first calculation condition CC1. According to such a first calculation condition CC1, a calculating device can be provided in which the accuracy can be increased.

Such a first calculation condition CC1 is employed in one example of the embodiment. For example, the number of the multiple connectors 20 connected to the first nonlinear oscillator s1 is taken as the first number $z_1$. The number of the multiple connectors 20 connected to the second nonlinear oscillator s2 is taken as the second number $z_2$. For example, the second number $z_2$ is greater than the first number $z_1$. The controller 70 performs the first operation in at least a portion of the calculation period (the first period). In the first operation, the controller 70 supplies the first signal sg1 to the first conductive member 15a and supplies the second signal sg2 to the second conductive member 15b. The frequency of the alternating current component of the second signal sg2 is greater than the frequency of the alternating current component of the first signal sg1. Thereby, for example, a low failure probability P1 is obtained.

For example, the multiple nonlinear oscillators 10 include the third nonlinear oscillator s3. The number of the multiple connectors 20 connected to the third nonlinear oscillator s3 is a third number $z_3$. The third number $z_3$ is greater than the second number $z_2$. In such a case, the first operation described above includes supplying the third signal sg3 to the third conductive member 15c in the first period described above. The frequency of the alternating current component of the third signal sg3 is greater than the frequency of the alternating current component of the second signal sg2. Thereby, for example, a low failure probability P1 is obtained. For example, other than the frequency of the alternating current component, the conditions of the first to third signals sg1 to sg3 are the same. For the first to third signals sg1 to sg3, the amplitude of the alternating current component and the magnitude of the direct current component respectively are substantially equal. The resonant frequencies of the first to third nonlinear oscillators s1 to s3 are substantially equal.

For example, it is considered that such a first calculation condition CC1 corresponds to one example of a modification of the detuning described below.

Figure 8:
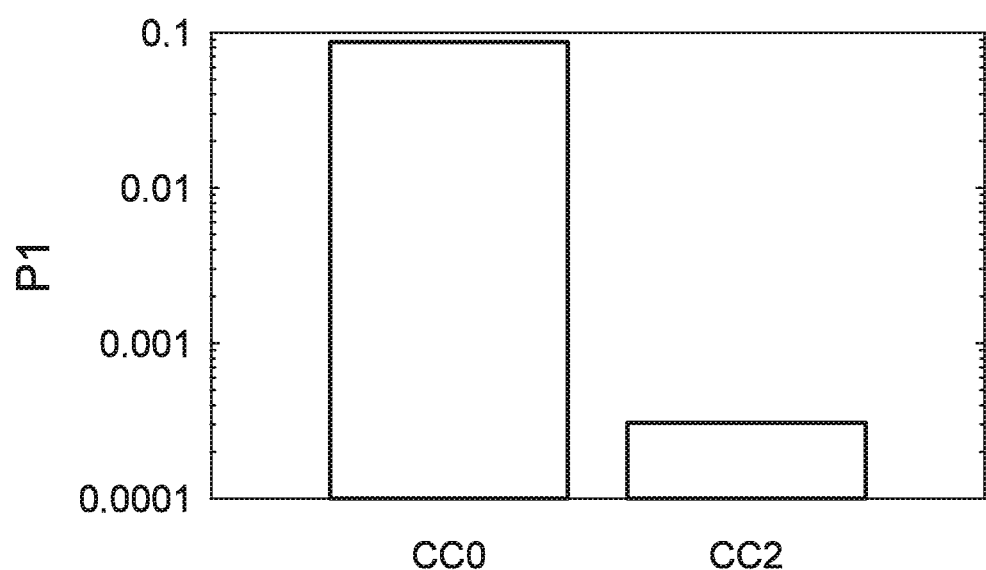
FIG. 8 is a graph illustrating calculation results.

FIG. 8 is a graph illustrating calculation results.

FIG. 8 shows an example of simulation results of calculation results when one problem is solved using different calculation conditions.

In FIG. 8, the vertical axis is the failure probability P1 of the calculation. The failure probability P1 is displayed logarithmically. FIG. 8 shows the result of the reference calculation condition CC0 and the result of a second calculation condition CC2. As described above, for the reference calculation condition CC0, the same signal is supplied to all of the multiple nonlinear oscillators 10.

For the second calculation condition CC2, the magnitudes of the direct current components of the signals supplied to the multiple nonlinear oscillators 10 are different according to the number of the multiple connectors 20 that are connected. In the simulation, the resonant frequency of the nonlinear oscillator 10 is set to increase when the direct current component of the supplied signal is increased. In such a case, the direct current component of the signal supplied to the nonlinear oscillator 10 having a large number of the multiple connectors 20 connected is less than the direct current component of the signal supplied to another nonlinear oscillator 10 having a small number of the multiple connectors 20 connected.

As shown in FIG. 8, compared to the reference calculation condition CC0, the failure probability is low for the second calculation condition CC2. According to such a second calculation condition CC2, a calculating device can be provided in which the accuracy can be increased.

In another simulation, the resonant frequency of the nonlinear oscillator 10 decreases when the direct current component of the supplied signal is increased. In such a case, the direct current component of the signal supplied to the nonlinear oscillator 10 having a large number of the multiple connectors 20 connected is greater than the direct current component of the signal supplied to another nonlinear oscillator 10 having a small number of the multiple connectors 20 connected. In such a case as well, similarly to the second calculation condition CC2 described above, a low failure probability P1 is obtained.

Such a second calculation condition CC2 is employed in one example of the embodiment. For example, the second number $z_2$ is greater than the first number $z_1$. The controller 70 performs the first operation in the first period. In the first operation, the controller 70 supplies the first signal sg1 to the first conductive member 15a and supplies the second signal sg2 to the second conductive member 15b. For example, in one example, there are cases where the first resonant frequency of the first nonlinear oscillator s1 increases when the first direct current component of the first signal sg1 is increased, and the second resonant frequency of the second nonlinear oscillator s2 increases when the second direct current component of the second signal sg2 is increased. In such a case, the controller 70 sets the second direct current component to be less than the first direct current component. Or, in such a case, the controller 70 sets the first direct current component to be greater than the second direct current component. Thereby, for example, a low failure probability P1 is obtained.

In another example, there are cases where the first resonant frequency decreases when the first direct current component is increased, and the second resonant frequency decreases when the second direct current component is increased. In such a case, the controller 70 sets the second direct current component to be greater than the first direct current component. Or, in such a case, the controller 70 sets the first direct current component to be less than the second direct current component. Thereby, for example, a low failure probability P1 is obtained.

For example, the multiple nonlinear oscillators 10 include the third nonlinear oscillator s3. The third number $z_3$ is greater than the second number $z_2$. The first operation includes supplying the third signal sg3 to the third conductive member 15c in the first period. In one example, there are cases where the third resonant frequency of the third nonlinear oscillator s3 increases when the third direct current component of the third signal sg3 is increased. In such a case, the controller 70 sets the third direct current component to be less than the second direct current component. Thereby, for example, a low failure probability P1 is obtained.

In another example, there are cases where the third resonant frequency decreases when the third direct current component is increased. In such a case, the controller 70 sets the third direct current component to be greater than the second direct current component. Thereby, for example, a low failure probability P1 is obtained.

For example, other than the magnitude of the direct current component, the conditions of the first to third signals sg1 to sg3 are the same. For the first to third signals sg1 to sg3, the frequency of the alternating current component and the amplitude of the alternating current component respectively are substantially equal. For example, it is considered that such a second calculation condition CC2 corresponds to another example of a modification of the detuning described below.

Figure 9:
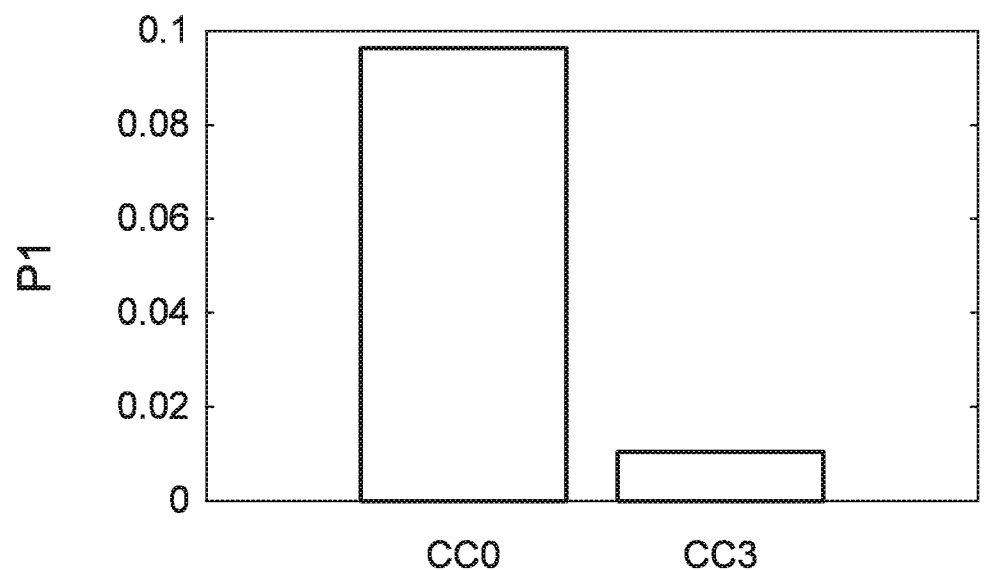
FIG. 9 is a graph illustrating calculation results.

FIG. 9 is a graph illustrating calculation results.

FIG. 9 shows an example of simulation results of calculation results when one problem is solved using different calculation conditions.

In FIG. 9, the vertical axis is the failure probability P1 of the calculation. FIG. 9 shows the results of the reference calculation condition CC0 and a third calculation condition CC3. For the reference calculation condition CC0 as described above, the same signal is supplied to all of the multiple nonlinear oscillators 10. For the third calculation condition CC3, the amplitude of the alternating current component of the signal supplied to the nonlinear oscillator 10 having a large number of the multiple connectors 20 connected is less than the amplitude of the alternating current component of the signal supplied to another nonlinear oscillator 10 having a small number of the multiple connectors 20 connected.

As shown in FIG. 9, compared to the reference calculation condition CC0, the failure probability is low for the third calculation condition CC3. According to such a third calculation condition CC3, a calculating device can be provided in which the accuracy can be increased.

Such a third calculation condition CC3 is employed in one example of the embodiment. For example, the second number $z_2$ is greater than the first number $z_1$. The controller 70 performs the first operation in the first period. In the first period, the controller 70 supplies the first signal sg1 to the first conductive member 15a and supplies the second signal sg2 to the second conductive member 15b. The amplitude of the alternating current component of the second signal sg2 is less than the amplitude of the alternating current component of the first signal sg1. Thereby, for example, a low failure probability P1 is obtained.

For example, the multiple nonlinear oscillators 10 include the third nonlinear oscillator s3. The number of the multiple connectors 20 connected to the third nonlinear oscillator s3 is the third number $z_3$. The third number $z_3$ is greater than the second number $z_2$. In such a case, the first operation described above includes supplying the third signal sg3 to the third conductive member 15c in the first period described above. The amplitude of the alternating current component of the third signal sg3 is less than the amplitude of the alternating current component of the second signal sg2. Thereby, for example, a low failure probability P1 is obtained.

For example, other than the amplitude of the alternating current component, the conditions of the first to third signals sg1 to sg3 are the same. For the first to third signals sg1 to sg3, the frequency of the alternating current component and the magnitude of the direct current component respectively are substantially equal. The resonant frequencies of the first to third nonlinear oscillators s1 to s3 are substantially equal.

For example, it is considered that such a third calculation condition CC3 corresponds to an example of a modification of the pumping amplitude described below.

For example, an Ising problem is solved in the calculating device 110 according to the embodiment. An example of an Ising problem is described below. The following first formula is applied to the Ising problem.

$$E_{Ising}(s) = -\frac{1}{2}\sum_{i=1}^{N}\sum_{j=1}^{N}J_{ij}s_is_j \quad (1)$$

In the first formula, "$s_i$" is the ith Ising spin. "$s_i$" has the values of ±1. In the first formula, $J_{ij}$ represents the interaction. $J_{ij}$ is taken to be equal to $J_{ji}$. $J_{ii}$ is set to 0.

In the Ising problem, a set of N Ising spins is determined to minimize the energy of the left side of the first formula.

Neighbor interactions are considered in the embodiment. For example, the following second formula is applied.

$$E_{LHZ}(\tilde{s}) = -\sum_{k=1}^{M}\tilde{J}_k\tilde{s}_k - C\sum_{\langle k,l,m,n\rangle}\tilde{s}_k\tilde{s}_l\tilde{s}_m\tilde{s}_n \quad (2)$$

In the second formula, M spins are considered. "M" is $N(N-1)/2$. The energy of the left side of the second formula is minimized.

In the second formula, $$\tilde{s}$$

is the spin.

In the second formula, $$\tilde{J}_k$$

corresponds to $J_{ij}$.

In the second formula, the second term of the right side corresponds to a four-body interaction. The neighboring spins are considered for the sum <k, l, m, n>.

In the second formula, $$\tilde{s}_k\tilde{s}_l\tilde{s}_m\tilde{s}_n$$

are the spins of the four-body interaction.

In the second formula, $$\tilde{s}_k\tilde{s}_l\tilde{s}_m\tilde{s}_n$$

is set to 1. This condition corresponds to a constraint condition.

In the second formula, "C" is a coefficient. "C" is positive. "C" is selected according to $$\tilde{J}_k$$

to satisfy the constraint condition described above.

Then, normalization is performed to satisfy the following third formula.

$$\tilde{J}'_k = \frac{\tilde{J}_k}{\sum_{k=1}^{M}|\tilde{J}_k|} \quad (3)$$

For example, the normalization prevents the necessary coefficient "C" from increasing as $$|\tilde{J}_k|$$

increases. By the normalization, $$\tilde{J}_k$$

and $$A\tilde{J}_k$$

can be treated using the same coefficient "C" (A being a constant).

Hereinbelow, $$\tilde{J}'_k$$

is written as $$\tilde{J}_k.$$

The energy minimization problem of the second formula can be solved by the bifurcation phenomenon of the Hamiltonian H represented by the following fourth, fifth, and sixth formulas.

$$H = H_{KPO} + H_{LHZ} \tag{4}$$

$$H_{KPO} = \sum_{k=1}^{M} \left[ \frac{K}{2} a_k^{\dagger} a_k^2 + \Delta_k a_k^{\dagger} a_k - \frac{p_k}{2} \left( a_k^{\dagger 2} + a_k^2 \right) \right] \tag{5}$$

$$H_{LHZ} = -\gamma \xi \sum_{k=1}^{M} \tilde{J}_k \left( a_k + a_k^{\dagger} \right) - \gamma C \sum_{(k,l,m,n)} \left( a_k^{\dagger} a_l^{\dagger} a_m a_n + h.c. \right) \tag{6}$$

Hereinbelow, the multiple nonlinear oscillators 10 are called a "KPO".

In the fifth formula, $$a_k$$

is the quantum annihilation operator of the oscillation of the KPO.

In the fifth formula, $$a_k^{\dagger}$$

is the quantum creation operator of the oscillation of the KPO and is a Hermitian conjugate of the annihilation operator described above.

In the fifth formula, "K" is the Kerr coefficient of the KPO. "$\Delta_k$" is the detuning of the KPO. "$p_k$" is the pumping amplitude of the KPO.

In the sixth formula, "$\gamma$" is a parameter of the neighbor interactions. "$\xi$" is a coefficient relating to the one-body term. For example, the one-body term corresponds to a signal having a frequency that is half of the parametric pump frequency. The amplitude of the signal is adjusted according to the Ising problem coefficient $$\tilde{J}_k.$$

In the embodiment as described above, the controller 70 changes the signals according to the number of the multiple connectors 20 that are connected. For example, when the number of the connectors 20 connected to the first nonlinear oscillator s1 is the first number $z_1$ and the number of the connectors 20 connected to the second nonlinear oscillator s2 is the second number $z_2$, the controller 70 sets the first signal sg1 and the second signal sg2 to cause the absolute value of $(p_2-\Delta_2)/K_2$ to be less than the absolute value of $(p_1-\Delta_1)/K_1$. "$p_1$" is the first pump amplitude of the first nonlinear oscillator s1. "$\Delta_1$" is a first detuning of the first nonlinear oscillator s1. "$K_1$" is a first Kerr coefficient of the first nonlinear oscillator s1. "$p_2$" is a second pump amplitude of the second nonlinear oscillator s2. "$\Delta_2$" is a second detuning of the second nonlinear oscillator s2. "$K_2$" is a second Kerr coefficient of the second nonlinear oscillator s2.

For example, the first detuning "$\Delta_1$" corresponds to the difference between the resonant frequency of the first nonlinear oscillator s1 and ½ of the frequency of the first signal sg1. For example, the second detuning "$\Delta_2$" corresponds to the difference between the resonant frequency of the second nonlinear oscillator s2 and ½ of the frequency of the second signal sg2.

For example, the first pump amplitude "$p_1$" corresponds to the product of the average number of photons and the Kerr coefficient of the first nonlinear oscillator s1. For example, the second pump amplitude "$p_2$" corresponds to the product of the average number of photons and the Kerr coefficient of the second nonlinear oscillator s2. For example, the first pump amplitude "$p_1$" is proportional to the amplitude of the alternating current component of the first signal sg1. The second pump amplitude "$p_2$" is proportional to the amplitude of the alternating current component of the second signal sg2. For example, the first Kerr coefficient "$K_1$" corresponds to the anharmonicity of the first nonlinear oscillator s1. For example, the second Kerr coefficient "$K_2$" corresponds to the anharmonicity of the second nonlinear oscillator s2. For example, the anharmonicity can be derived from the spectrum. For example, $K/(2\pi)=f12-f01$ holds. "f01" corresponds to the frequency corresponding to the excitation from a "vacuum" to a "single-photon state". "f12" is the frequency corresponding to the excitation from a "single-photon state" to a "two-photon state".

A more stable calculation result is obtained by employing such a signal in at least one period (e.g., the first period) of the calculation period. A higher correct solution rate is obtained.

In one example, the first period is, for example, a period near the end of the calculation period. For example, the controller 70 performs the calculation in a calculation period from a start time to an end time. The first period is after ½ of the length of the calculation period has elapsed from the start time. The first operation described above (the operation of supplying different signals) is performed in such a first period. The first operation described above may be performed in the entire calculation period.

In one example according to the embodiment, in the first period, the controller 70 may control the first signal sg1 and the second signal sg2 to cause the absolute value of the detuning (the first detuning) of the first nonlinear oscillator s1 to be less than the absolute value of the detuning (the second detuning) of the second nonlinear oscillator s2. For example, in the first period, the controller 70 may control the first signal sg1, the second signal sg2, and the third signal sg3 to cause the absolute value of the second detuning to be less than the absolute value of the detuning (the third detuning) of the third nonlinear oscillator s3.

In one example according to the embodiment, in the first period, the controller 70 may control the first signal sg1 and the second signal sg2 to cause the first detuning of the first nonlinear oscillator s1 to be the product of the first number $z_1$ and a proportionality coefficient, and to cause the second detuning of the second nonlinear oscillator s2 to be the product of the second number $z_2$ and the proportionality coefficient. For example, the controller 70 may control the first signal sg1, the second signal sg2, and the third signal sg3 to cause the third detuning to be the product of the third number $z_3$ and the proportionality coefficient.

As described above, the first detuning is the difference between the resonant frequency of the first nonlinear oscillator s1 and ½ of the frequency of the first signal sg1. The second detuning is the difference between the resonant oscillation frequency of the second nonlinear oscillator s2 and ½ of the frequency of the second signal sg2. For example, in the first period, the controller 70 sets the first detuning of the first nonlinear oscillator s1 to be $(p/K)\gamma C z_1$ and sets the second detuning of the second nonlinear oscillator s2 to be $(p/K)\gamma C z_2$. "p" is the average pump amplitude of the first and second nonlinear oscillators s1 and s2. "K" is the average Kerr coefficient of the first and second nonlinear oscillators s1 and s2. "γ" is a coefficient common to the first and second nonlinear oscillators s1 and s2. "C" is a coefficient relating to a four-body interaction. "$z_1$" is the first number described above. "$z_2$" is the second number described above.

In the embodiment, for example, the following is applicable when the multiple nonlinear oscillators 10 include the third nonlinear oscillator s3. The third nonlinear oscillator s3 includes the third conductive member 15c, and the third circuit part 12c that includes the fifth Josephson junction 11e and the sixth Josephson junction 11f. The number of the multiple connectors 20 connected to the third nonlinear oscillator s3 is the third number $z_3$. The third number $z_3$ is greater than the second number $z_2$. In the example of FIG. 1, the third number $z_3$ is 3. The first operation described above includes supplying the third signal sg3 to the third conductive member 15c in the first period described above. The third signal sg3 is different from the first signal sg1 and different from the second signal sg2.

For example, the controller 70 sets the first signal sg1, the second signal sg2, and the third signal sg3 to cause the absolute value of $(p_2-\Delta_2)/K_2$ to be less than the absolute value of $(p_1-\Delta_1)/K_1$ and to cause the absolute value of $(p_3-\Delta_3)/K_3$ to be less than the absolute value of $(p_2-d_2)/K_2$. "$p_3$" is the third pump amplitude of the third nonlinear oscillator s3. "$\Delta_3$" is the third detuning of the third nonlinear oscillator s3. "$K_3$" is the third Kerr coefficient of the third nonlinear oscillator s3.

Figure 10:
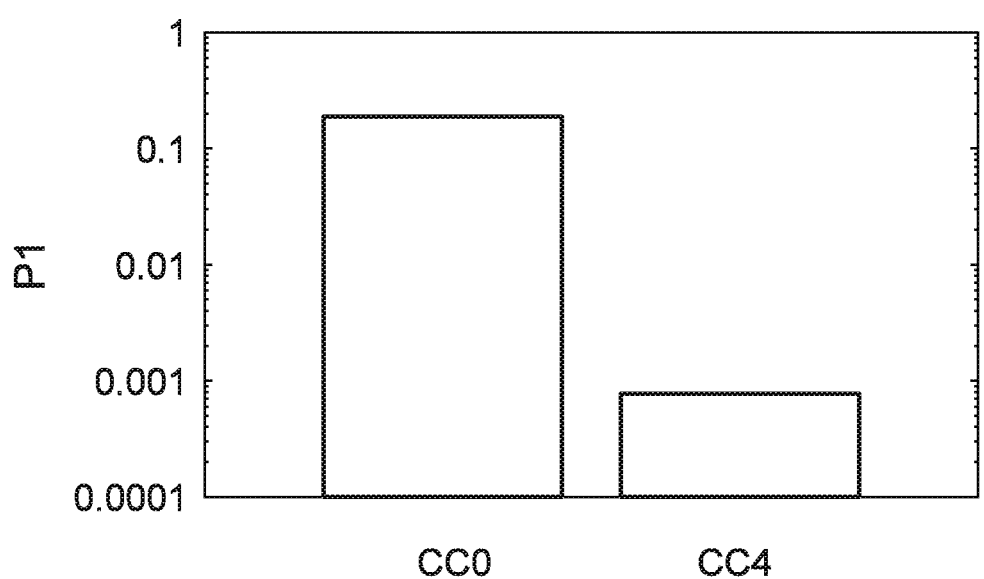
FIG. 10 is a graph illustrating calculation results.

FIG. 10 is a graph illustrating calculation results.

FIG. 10 shows an example of simulation results of calculation results when one problem is solved using different calculation conditions.

In FIG. 10, the vertical axis is the failure probability P1 of the calculation. FIG. 10 shows the results of the reference calculation condition CC0 and a fourth calculation condition CC4. For the reference calculation condition CC0 as described above, the same signal is supplied to all of the multiple nonlinear oscillators 10. For the fourth calculation condition CC4, the signals that are applied cause the absolute value of $(p_2-\Delta_2)/K_2$ to be less than the absolute value of $(p_1-\Delta_1)/K_1$ and causes the absolute value of $(p_3-\Delta_3)/K_3$ to be less than the absolute value of $(p_2-\Delta_2)/K_2$. For the fourth calculation condition CC4, the detuning "d" is modified so that the conditions described above are satisfied.

As shown in FIG. 10, compared to the reference calculation condition CC0, the failure probability is low for the fourth calculation condition CC4. According to such a fourth calculation condition CC4, a calculating device can be provided in which the accuracy can be increased.

For example, the operation according to the embodiment can be performed by modifying at least one of the detuning or the pump amplitude according to the number of the multiple connectors 20 that are connected. For example, the frequencies of the alternating current components of the signals supplied to the multiple nonlinear oscillators 10 are modified according to the number of the multiple connectors 20. For example, such a frequency modification corresponds to a modification of the detuning. For example, the magnitudes of the direct current components of the signals supplied to the multiple nonlinear oscillators 10 are modified according to the number of the multiple connectors 20. For example, such a magnitude modification corresponds to a modification of the detuning. For example, the amplitudes of the alternating current components of the signals supplied to the multiple nonlinear oscillators 10 are modified according to the number of the multiple connectors 20. For example, such an amplitude modification corresponds to a modification of the pump amplitude.

According to the embodiment, a low failure probability P1 is obtained. According to the embodiment, a calculating device can be provided in which the accuracy can be increased.

FIGS. 11A to 11D are schematic views illustrating operations of the calculating device according to the first embodiment.

In these graphs, the horizontal axis is a time tm. The vertical axis is a difference ΔD between the signals of the multiple nonlinear oscillators 10. For example, the difference ΔD corresponds to the difference between the first signal sg1 and the second signal sg2. The difference ΔD may include, for example, at least one of a first difference (e.g., the absolute value of the difference) between the frequency of the alternating current component of the first signal sg1 and the frequency of the alternating current component of the second signal sg2, a second difference (e.g., the absolute value of the difference) between the magnitude of the direct current component of the first signal sg1 and the magnitude of the direct current component of the second signal sg2, or a third difference (e.g., the absolute value of the difference) between the amplitude of the alternating current component of the first signal sg1 and the amplitude of the alternating current component of the second signal sg2. The difference ΔD may include, for example, the difference between $(p_1-\Delta_1)/K_1$ and $(p_2-\Delta_2)/K_2$.

Figure 11A:
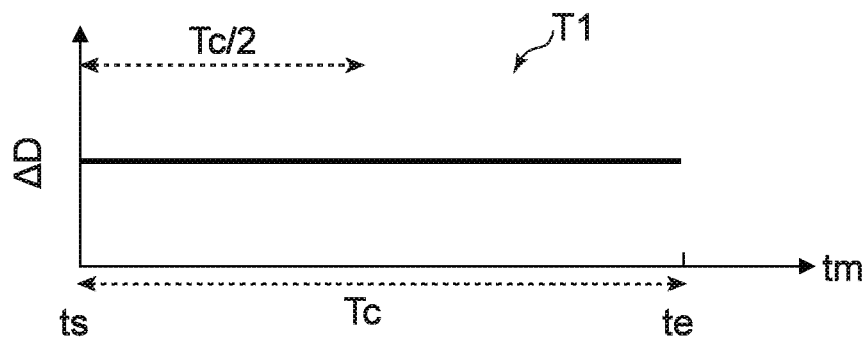
FIGS. 11A to 11D are schematic views illustrating operations of the calculating device according to the first embodiment.

As shown in FIG. 11A, a calculation period Tc is the period from a start time ts to an end time te. The controller 70 (the calculating device 110) performs the calculation in the calculation period Tc. The calculation period Tc may be set to match the characteristics of the calculating device 110, the problem to be solved, the necessary accuracy, etc.

As shown in FIG. 11A, in one example according to the embodiment, the difference ΔD is set to a determined value for the entire calculation period Tc.

Figure 11B:
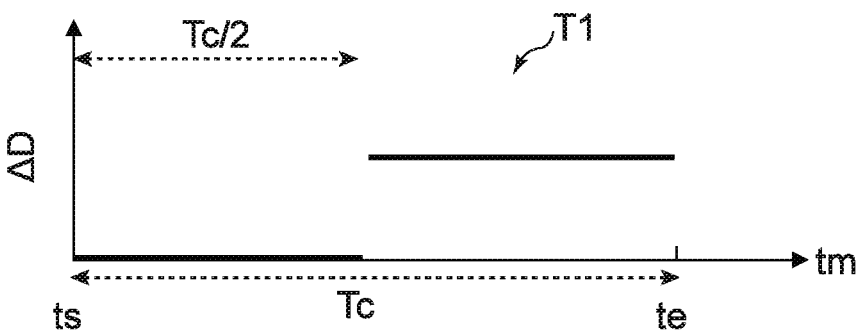

As shown in FIG. 11B, in one example according to the embodiment, the difference ΔD may be set to the determined value after the time tm of ½ of the length of the calculation period Tc has elapsed.

Figure 11C:
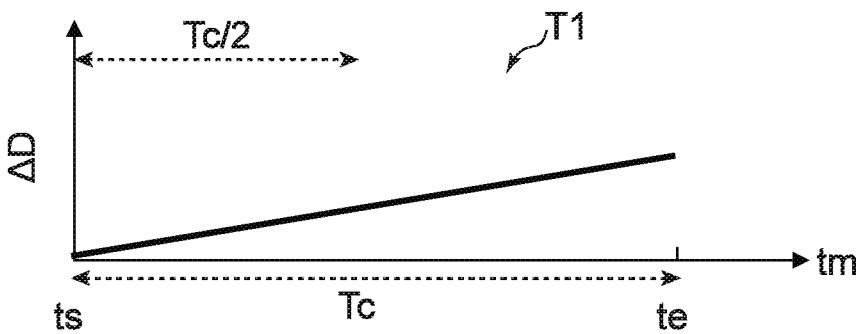

As shown in FIG. 11C, the difference ΔD may change with the elapse of the time tm. In the example, the difference ΔD increases as the time tm elapses.

Figure 11D:
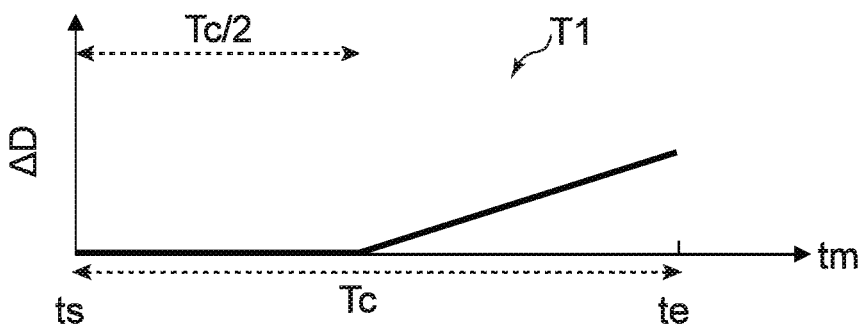

As shown in FIG. 11D, the difference ΔD may change with the elapse of the time tm after the time tm of ½ of the length of the calculation period Tc has elapsed.

Thus, in one example according to the embodiment, a first period T1 in which the difference ΔD is set to the determined value may be after the time tm of the length of ½ of the length of the calculation period Tc has elapsed from the start time ts. The failure probability of the calculation can be reduced by providing the difference ΔD of the signals such as those described above in at least a period near the end time te. The accuracy can be effectively improved.

Second Embodiment

A calculating device according to a second embodiment includes, for example, the multiple nonlinear oscillators 10 and the multiple connectors 20 illustrated in FIG. 1. The calculating device according to the second embodiment may further include the controller 70. In the second embodiment, the sizes (the surrounded surface areas) of the circuit parts included in the multiple nonlinear oscillators 10 are different from each other.

There are cases where the resonant frequency of the nonlinear oscillator 10 increases and cases where the resonant frequency of the nonlinear oscillator 10 decreases when the surface area of the region surrounded with the circuit part 12x is increased. Such differences occur due to the condition of the direct current component of the signal in the nonlinear oscillator 10. In the embodiment, the surface areas are modified so that the resonant frequency of the nonlinear oscillator 10 decreases when the number of the multiple connectors 20 that are connected is increased in either case of the resonant frequency of the nonlinear oscillator 10 increasing or decreasing when the surface area of the region surrounded with the circuit part 12x is increased.

An example of the multiple nonlinear oscillators 10 will now be described.

Figure 12A:
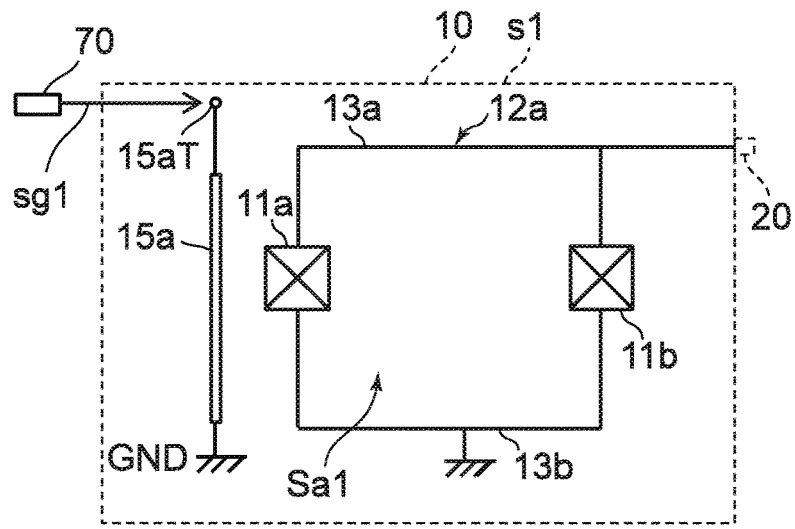
FIGS. 12A to 12C are schematic views illustrating portions of the calculating device according to the first embodiment.
Figure 12B:
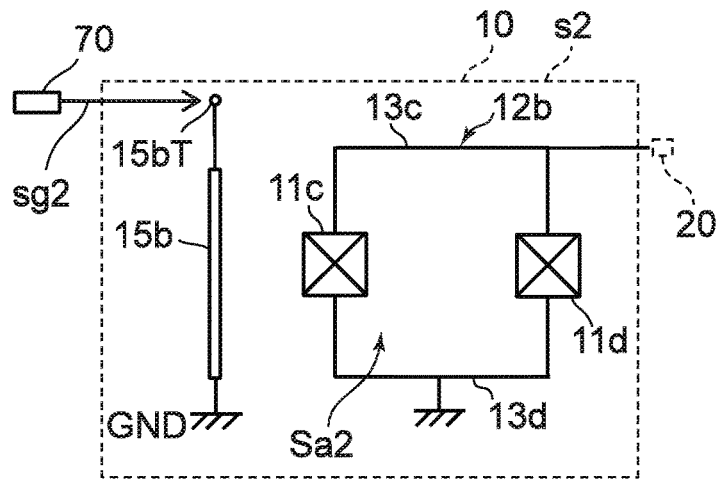
Figure 12C:
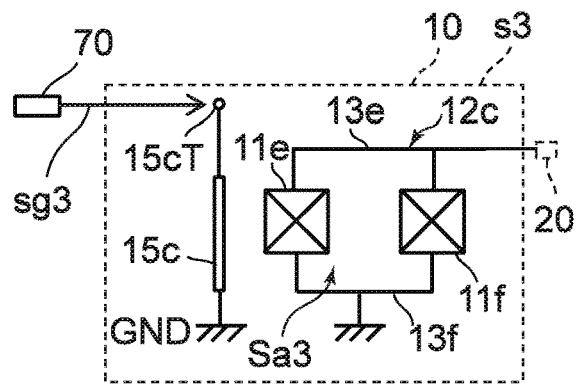

FIGS. 12A to 12C are schematic views illustrating portions of the calculating device according to the first embodiment.

As shown in FIG. 12A, the first nonlinear oscillator s1 includes the first conductive member 15a, and the first circuit part 12a that includes the first Josephson junction 11a and the second Josephson junction 11b. As shown in FIG. 12B, the second nonlinear oscillator s2 includes the second conductive member 15b, and the second circuit part 12b that includes the third Josephson junction 11c and the fourth Josephson junction 11d. As shown in FIG. 12C, the third nonlinear oscillator s3 includes the third conductive member 15c, and the third circuit part 12c that includes the fifth Josephson junction 11e and the sixth Josephson junction 11f.

As shown in FIG. 1, the number of the multiple connectors 20 connected to the first nonlinear oscillator s1 is the first number $z_1$. The number of the multiple connectors 20 connected to the number of the multiple connectors 20 connected to the third nonlinear oscillator s3 is the third number $z_3$.

In the example shown in FIGS. 12A to 12C, the resonant frequency of the nonlinear oscillator 10 increases when the surface area of the region surrounded with the circuit part 12x is increased.

As shown in FIG. 12A, the region that is surrounded with the first circuit part 12a is taken as a first region Sa1. As shown in FIG. 12B, the region that is surrounded with the second circuit part 12b is taken as a second region Sat. As shown in FIG. 12C, the region that is surrounded with the third circuit part 12c is taken as a third region Sa3.

The surface area of the first region Sa1 is greater than the surface area of the second region Sat. The first resonant frequency of the first nonlinear oscillator s1 is greater than the second resonant frequency of the second nonlinear oscillator s2. The surface area of the second region Sat is greater than the surface area of the third region Sa3. The second resonant frequency is greater than the third resonant frequency of the third nonlinear oscillator s3. For example, for the fourth to sixth nonlinear oscillators s4 to s6 as well, the surface areas that are surrounded with the circuit parts are modified according to the number of the multiple connectors 20 that are connected.

Figure 13:
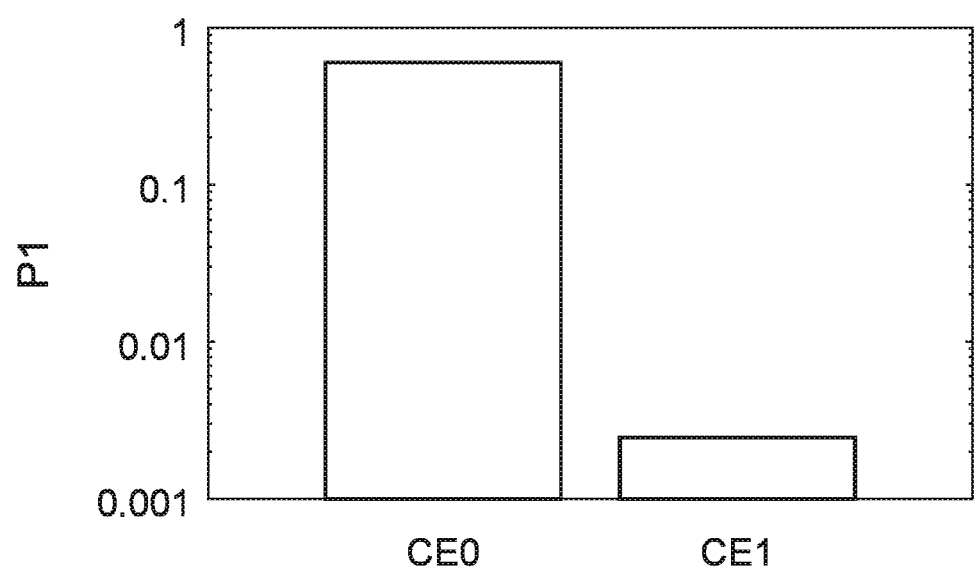
FIG. 13 is a graph illustrating calculation results.

FIG. 13 is a graph illustrating calculation results. FIG. 13 shows an example of simulation results of calculation results when one problem is solved using different calculation conditions.

In FIG. 13, the vertical axis is the failure probability P1 of the calculation. FIG. 13 shows the results of a reference element condition CE0 and a first element condition CE1. For the reference element condition CE0, the surface area that is surrounded with the circuit part 12x is the same for the multiple nonlinear oscillators 10. For the first element condition CE1, the surface area of the first region Sa1 is greater than the surface area of the second region Sat. The first resonant frequency is greater than the second resonant frequency. The surface area of the second region Sat is greater than the surface area of the third region Sa3. The second resonant frequency is greater than the third resonant frequency.

As shown in FIG. 13, compared to the reference element condition CE0, the failure probability is low for the first element condition CE1. According to such a first element condition CE1, a calculating device can be provided in which the accuracy can be increased.

Thus, in the second embodiment, when the resonant frequency of the nonlinear oscillator 10 increases when the surface area of the region surrounded with the circuit part 12x is increased, the surface area that is surrounded with the circuit part included in the nonlinear oscillator 10 having a large number of the multiple connectors 20 connected is less than the surface area surrounded with the circuit part included in the nonlinear oscillator 10 having a small number of the multiple connectors 20 that are connected. The failure probability P1 of the calculation can be reduced by such a configuration.

An example in the case where the resonant frequency of the nonlinear oscillator 10 decreases when the surface area of the region surrounded with the circuit part 12x is increased will now be described.

Figure 14A:
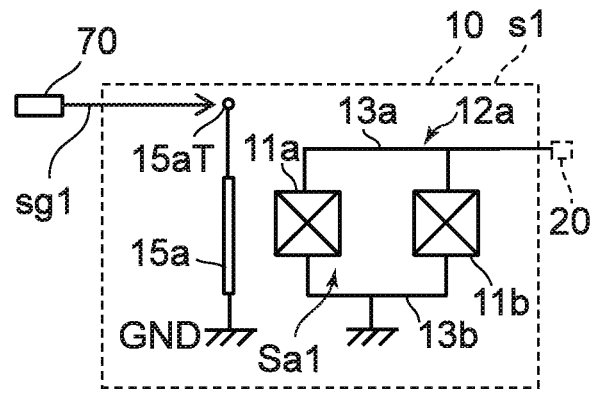
FIGS. 14A to 14C are schematic views illustrating portions of the calculating device according to the first embodiment.
Figure 14B:
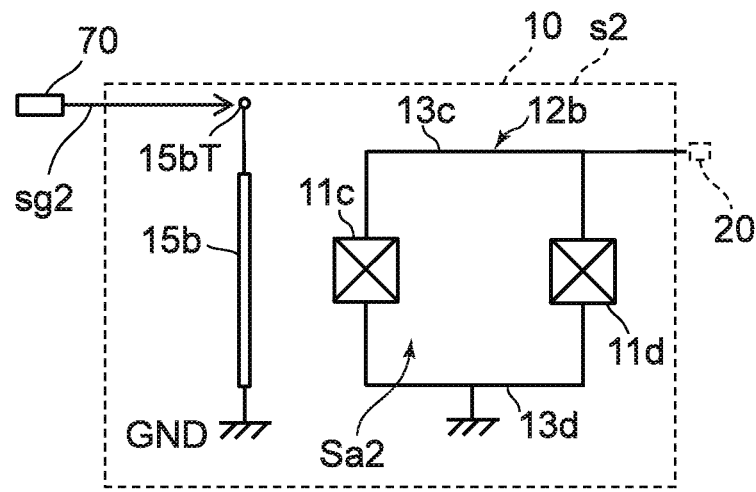
Figure 14C:
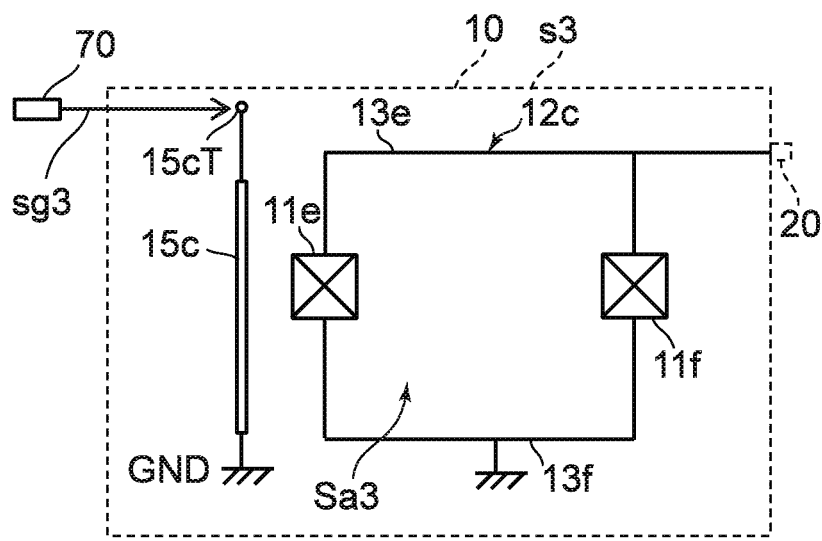

FIGS. 14A to 14C are schematic views illustrating portions of the calculating device according to the first embodiment.

In the example shown in FIGS. 14A to 14C, the resonant frequency of the nonlinear oscillator 10 decreases when the surface area of the region surrounded with the circuit part 12x is increased. As shown in FIG. 14A, the first nonlinear oscillator s1 includes the first circuit part 12a and the first conductive member 15a. As shown in FIG. 14B, the second nonlinear oscillator s2 includes the second circuit part 12b and the second conductive member 15b. As shown in FIG. 14C, the third nonlinear oscillator s3 includes the third circuit part 12c and the third conductive member 15c. The number of the multiple connectors 20 connected to the first nonlinear oscillator s1 is the first number $z_1$. The number of the multiple connectors 20 connected to the number of the multiple connectors 20 connected to the third nonlinear oscillator s3 is the third number $z_3$.

The region that is surrounded with the first circuit part 12a is taken as the first region Sa1. The region that is surrounded with the second circuit part 12b is taken as the second region Sat. The region that is surrounded with the third circuit part 12c is taken as the third region Sa3.

The surface area of the first region Sa1 is less than the surface area of the second region Sat, and the first resonant frequency is greater than the second resonant frequency. The surface area of the second region Sat is less than the surface area of the third region Sa3, and the second resonant frequency is greater than the third resonant frequency. According to such element conditions as well, a low failure probability is obtained.

For example, the modification of the surface area of the circuit part included in the nonlinear oscillator corresponds to a modification of the detuning. In the second embodiment as well, a calculating device can be provided in which the accuracy can be increased.

FIGS. 15A to 15G are schematic views illustrating portions of the calculating device according to the first embodiment.

Figure 15A:
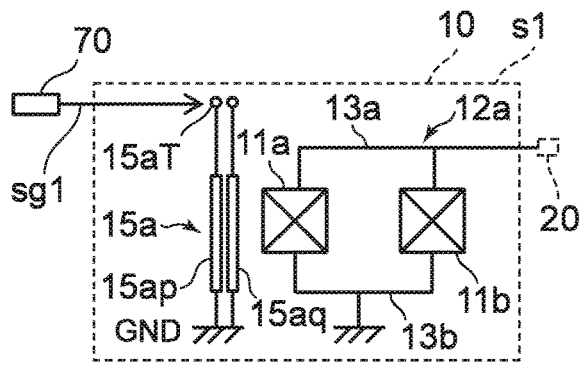
FIGS. 15A to 15G are schematic views illustrating portions of the calculating device according to the first embodiment.
Figure 15B:
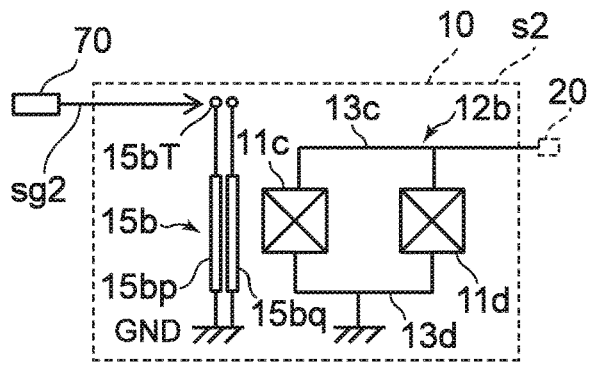
Figure 15C:
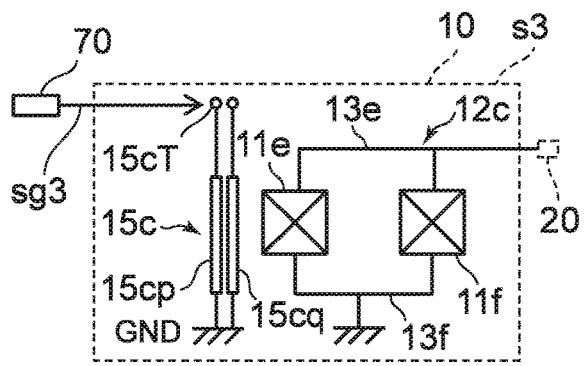
Figure 15D:
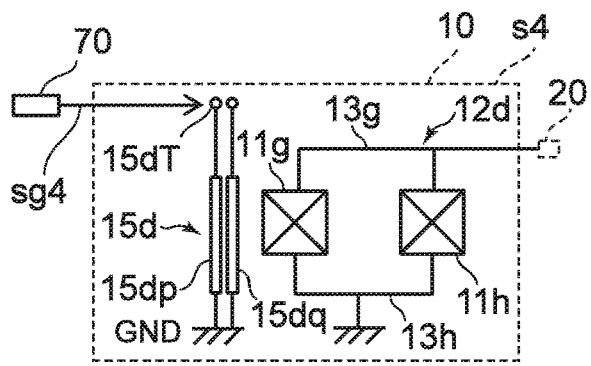
Figure 15E:
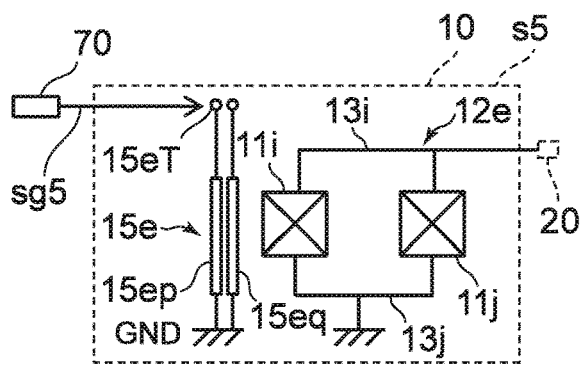
Figure 15F:
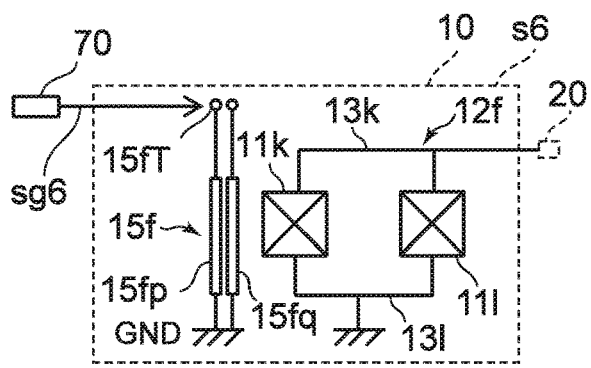
Figure 15G:
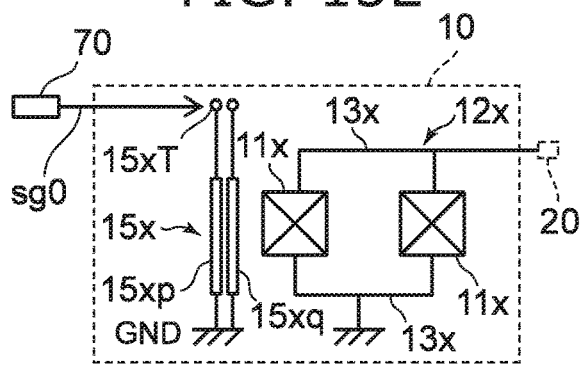

As shown in FIG. 15G, the conductive member 15x may include multiple parts (e.g., a conductive part 15xp, a conductive part 15xq, etc.). For example, the first to sixth conductive members 15a to 15f each may include multiple parts. The multiple parts include, for example, a conductive part 15ap, a conductive part 15aq, a conductive part 15bp, a conductive part 15bq, a conductive part 15cp, a conductive part 15cq, a conductive part 15dp, a conductive part 15dq, a conductive part 15ep, a conductive part 15eq, a conductive part 15fp, a conductive part 15fq, etc. For example, an alternating current component of the signal may be supplied to one of the multiple parts, and a direct current component of the signal may be supplied to another one of the multiple parts. In one example, an alternating current signal may be supplied to the conductive part 15ap as a portion of the first signal sg1, and a direct current signal may be supplied to the conductive part 15aq as a portion of the first signal sg1. A configuration similar to the example described above relating to the first conductive member 15a is applicable to the second to sixth conductive members 15b to 15f.

In one example, for example, a common signal may be supplied to the conductive parts 15ap to 15fp, and signals that are different from each other may be supplied to the conductive parts 15aq to 15fq.

In the simulation described above, the calculation is performed based on the following seventh to ninth formulas.

$$\hbar\Delta = 4\left[E_C E_J \cos\left(\frac{\pi\Phi^{dc}}{\Phi_0}\right)\right]^{\frac{1}{2}} - E_C - \frac{\hbar\omega_p}{2} \quad (7)$$

$$\hbar p = \pi\delta_p \left[E_C E_J \cos\left(\frac{\pi\Phi^{dc}}{\Phi_0}\right)\right]^{\frac{1}{2}} \tan\left(\frac{\pi\Phi^{dc}}{\Phi_0}\right) \quad (8)$$

$$\hbar K = -E_C \quad (9)$$

The seventh formula recited above represents the detuning. The first and second terms on the right side of the seventh formula correspond to the resonant frequency of the KPO. The third term on the right side of the seventh formula corresponds to ½ of the frequency of the alternating current component of the signal. In the seventh formula, for example, "Ec" corresponds to the electrostatic energy relating to the parallel capacitance for the circuit part 12x. In the seventh formula, "EJ" corresponds to the Josephson energy relating to the Josephson junction 11x. In the seventh formula, "$\Phi^{dc}$" is the magnetic flux applied to the circuit part (e.g., the circuit part 12x referring to FIG. 2G). "$\Phi^{dc}$" is dependent on the direct current component of the signal. In the seventh formula, "$\Phi_0$" is the magnetic flux quantum.

The eighth formula represents the pump amplitude. In the eighth formula, "$\delta_p$" is proportional to the amplitude of the alternating current component of the signal. The ninth formula represents the Kerr coefficient.

In the simulation described above, the initial state is set to a vacuum. The multiple KPOs (the multiple nonlinear oscillators 10) are connected as illustrated in FIG. 1. At the initial time, the parameters are set so that the vacuum is the basis state. External excitation that corresponds to the problem is applied to the multiple KPOs. After starting the calculation, the parameters are changed with the time evolution, and bifurcations are generated. By changing the parameters sufficiently slowly, the state of the system can maintain the ground state. For example, changing the parameters sufficiently slowly corresponds to an adiabatic operation. After sufficient bifurcations are generated, the multiple KPOs reach a roughly coherent state. Subsequently, the quadrature amplitudes of the multiple KPOs are detected (measured). The solution of the problem is obtained from the signs of the detection result.

The embodiments include the following configurations (e.g., technological proposals).

Configuration 1

A calculating device, comprising:

a plurality of nonlinear oscillators;

a plurality of connectors, one of the plurality of connectors connecting at least two of the plurality of nonlinear oscillators; and a controller, the plurality of nonlinear oscillators including a first nonlinear oscillator and a second nonlinear oscillator, the first nonlinear oscillator including a first circuit part and a first conductive member, the first circuit part including a first Josephson junction and a second Josephson junction, the second nonlinear oscillator including a second circuit part and a second conductive member, the second circuit part including a third Josephson junction and a fourth Josephson junction, a number of the plurality of connectors connected to the first nonlinear oscillator being a first number, a number of the plurality of connectors connected to the second nonlinear oscillator being a second number, the second number being greater than the first number, in a first period, the controller being configured to perform at least a first operation of supplying a first signal to the first conductive member and supplying a second signal to the second conductive member, the second signal being different from the first signal, in the first period, the controller setting the first and second signals to cause an absolute value of $(p_2-\Delta_2)/K_2$ to be less than an absolute value of $(p_1-\Delta_1)/K_1$, $p_1$ being an amount proportional to an amplitude of an alternating current component of a signal of the first nonlinear oscillator, $\Delta_1$ being a difference between a resonant frequency of the first nonlinear oscillator and ½ of a frequency of the first signal, $K_1$ being an anharmonicity of the first nonlinear oscillator, $p_2$ being an amount proportional to an amplitude of an alternating current component of a signal of the second nonlinear oscillator, $\Delta_2$ being a difference between a resonant frequency of the second nonlinear oscillator and ½ of a frequency of the second signal, $K_2$ being an anharmonicity of the second nonlinear oscillator.

Configuration 2

The calculating device according to Configuration 1, wherein $p_1$ is a first pump amplitude of the first nonlinear oscillator, $\Delta_1$ is a first detuning of the first nonlinear oscillator, $K_1$ is a first Kerr coefficient of the first nonlinear oscillator, $p_2$ is a second pump amplitude of the second nonlinear oscillator, $\Delta_2$ is a second detuning of the second nonlinear oscillator, and $K_2$ is a second Kerr coefficient of the second nonlinear oscillator.

Configuration 3

The calculating device according to Configuration 1 or 2, wherein the plurality of nonlinear oscillators includes a third nonlinear oscillator, the third nonlinear oscillator includes a third circuit part and a third conductive member, the third circuit part includes a fifth Josephson junction and a sixth Josephson junction, a number of the plurality of connectors connected to the third nonlinear oscillator is a third number, the third number is greater than the second number, the first operation includes supplying a third signal to the third conductive member in the first period, and the third signal is different from the first signal and different from the second signal.

Configuration 4

The calculating device according to Configuration 3, wherein in the first period, the controller sets the first, second, and third signals to cause an absolute value of $(p_2-\Delta_2)/K_2$ to be less than an absolute value of $(p_1-\Delta_1)/K_1$ and to cause an absolute value of $(p_3-d_3)/K_3$ to be less than the absolute value of $(p_2-\Delta_2)/K_2$, $p_1$ is an amount proportional to an amplitude of an alternating current component of a signal of the first nonlinear oscillator, $\Delta_1$ is a difference between a resonant frequency of the first nonlinear oscillator and ½ of a frequency of the first signal, $K_1$ is an anharmonicity of the first nonlinear oscillator, $p_2$ is an amount proportional to an amplitude of an alternating current component of a signal of the second nonlinear oscillator, $\Delta_2$ is a difference between a resonant frequency of the second nonlinear oscillator and ½ of a frequency of the second signal, $K_2$ is an anharmonicity of the second nonlinear oscillator, $p_3$ is an amount proportional to an amplitude of an alternating current component of a signal of the third nonlinear oscillator, $\Delta_3$ is a difference between a resonant frequency of the third nonlinear oscillator and ½ of a frequency of the third signal, and $K_3$ is an anharmonicity of the third nonlinear oscillator.

Configuration 5

The calculating device according to Configuration 3, wherein in the first period, the controller sets the first, second, and third signals to cause an absolute value of $(p_2-\Delta_2)/K_2$ to be less than an absolute value of $(p_1-\Delta_1)/K_1$ and to cause an absolute value of $(p_3-\Delta_3)/K_3$ to be less than the absolute value of $(p_2-\Delta_2)/K_2$, $p_1$ is a first pump amplitude of the first nonlinear oscillator, $\Delta_1$ is a first detuning of the first nonlinear oscillator, $K_1$ is a first Kerr coefficient of the first nonlinear oscillator, $p_2$ is a second pump amplitude of the second nonlinear oscillator, $\Delta_2$ is a second detuning of the second nonlinear oscillator, $K_2$ is a second Kerr coefficient of the second nonlinear oscillator, $p_3$ is a third pump amplitude of the third nonlinear oscillator, $\Delta_3$ is a third detuning of the third nonlinear oscillator, and $K_3$ is a third Kerr coefficient of the third nonlinear oscillator.

Configuration 6

A calculating device, comprising:

a plurality of nonlinear oscillators;

a plurality of connectors, one of the plurality of connectors connecting at least two of the plurality of nonlinear oscillators; and a controller, the plurality of nonlinear oscillators including a first nonlinear oscillator and a second nonlinear oscillator, the first nonlinear oscillator including a first circuit part and a first conductive member, the first circuit part including a first Josephson junction and a second Josephson junction, the second nonlinear oscillator including a second circuit part and a second conductive member, the second circuit part including a third Josephson junction and a fourth Josephson junction, a number of the plurality of connectors connected to the first nonlinear oscillator being a first number, a number of the plurality of connectors connected to the second nonlinear oscillator being a second number, the second number being greater than the first number, in a first period, the controller being configured to perform at least a first operation of supplying a first signal to the first conductive member and supplying a second signal to the second conductive member, the second signal being different from the first signal, in the first period, the controller controlling the first and second signals to cause an absolute value of a first detuning of the first nonlinear oscillator to be less than an absolute value of a second detuning of the second nonlinear oscillator.

Configuration 7

The calculating device according to Configuration 6, wherein in the first period, the controller controls the first and second signals to cause the first detuning to be a product of the first number and a proportionality coefficient, and to cause the second detuning to be a product of the second number and the proportionality coefficient.

Configuration 8

The calculating device according to Configuration 6 or 7, wherein the first detuning is a difference between a resonant frequency of the first nonlinear oscillator and ½ of a frequency of the first signal, and the second detuning is a difference between a resonant frequency of the second nonlinear oscillator and ½ of a frequency of the second signal.

Configuration 9

The calculating device according to any one of Configurations 6 to 8, wherein the first detuning is $(p/K)\gamma Cz_1$, the second detuning is $(p/K)\gamma Cz_2$, $p$ is an average pump amplitude of the first and second nonlinear oscillators, $K$ is an average Kerr coefficient of the first and second nonlinear oscillators, $\gamma$ is a coefficient common to the first and second nonlinear oscillators, $C$ is a coefficient relating to a four-body interaction, $z_1$ is the first number, and
$z_2$ is the second number.

Configuration 10

The calculating device according to any one of Configurations 6 to 9, wherein
the plurality of nonlinear oscillators includes a third nonlinear oscillator,
the third nonlinear oscillator includes a third circuit part and a third conductive member,
the third circuit part includes a fifth Josephson junction and a sixth Josephson junction,
a number of the plurality of connectors connected to the third nonlinear oscillator is a third number,
the third number is greater than the second number,
the first operation includes supplying a third signal to the third conductive member in the first period, and
the third signal is different from the first signal and different from the second signal.

Configuration 11

The calculating device according to Configuration 10, wherein
in the first period, the controller controls the first, second, and third signals to cause the absolute value of the second detuning to be less than an absolute value of a third detuning of the third nonlinear oscillator.

Configuration 12

The calculating device according to Configuration 11, wherein
the controller controls the first, second, and third signals to cause the first detuning to be a product of the first number and a proportionality coefficient, to cause the second detuning to be a product of the second number and the proportionality coefficient, and to cause the third detuning to be a product of the third number and the proportionality coefficient.

Configuration 13

The calculating device according to Configuration 12, wherein
the first detuning is a difference between a resonant frequency of the first nonlinear oscillator and ½ of a frequency of the first signal,
the second detuning is a difference between a resonant frequency of the second nonlinear oscillator and ½ of a frequency of the second signal, and
the third detuning is a difference between a resonant frequency of the third nonlinear oscillator and ½ of a frequency of the third signal.

Configuration 14

A calculating device, comprising:
a plurality of nonlinear oscillators;
a plurality of connectors, one of the plurality of connectors connecting at least two of the nonlinear oscillators; and
a controller,
the plurality of nonlinear oscillators including a first nonlinear oscillator and a second nonlinear oscillator,
the first nonlinear oscillator including a first circuit part and a first conductive member,
the first circuit part including a first Josephson junction and a second Josephson junction,
the second nonlinear oscillator including a second circuit part and a second conductive member,
the second circuit part including a third Josephson junction and a fourth Josephson junction,
a number of the plurality of connectors connected to the first nonlinear oscillator being a first number,
a number of the plurality of connectors connected to the second nonlinear oscillator being a second number,
the second number being greater than the first number,
in the first period, the controller being configured to perform at least a first operation of supplying a first signal to the first conductive member and supplying a second signal to the second conductive member,
a frequency of an alternating current component of the second signal being greater than a frequency of an alternating current component of the first signal.

Configuration 15

The calculating device according to Configuration 14, wherein
the plurality of nonlinear oscillators includes a third nonlinear oscillator,
the third nonlinear oscillator includes a third circuit part and a third conductive member,
the third circuit part includes a fifth Josephson junction and a sixth Josephson junction,
a number of the plurality of connectors connected to the third nonlinear oscillator is a third number,
the third number is greater than the second number,
the first operation includes supplying a third signal to the third conductive member in the first period, and
a frequency of an alternating current component of the third signal is greater than the frequency of the alternating current component of the second signal.

Configuration 16

A calculating device, comprising:
a plurality of nonlinear oscillators;
a plurality of connectors, one of the plurality of connectors connecting at least two of the nonlinear oscillators; and
a controller,
the plurality of nonlinear oscillators including a first nonlinear oscillator and a second nonlinear oscillator,
the first nonlinear oscillator including a first circuit part and a first conductive member,
the first circuit part including a first Josephson junction and a second Josephson junction,
the second nonlinear oscillator including a second circuit part and a second conductive member,
the second circuit part including a third Josephson junction and a fourth Josephson junction,
a number of the plurality of connectors connected to the first nonlinear oscillator being a first number,
a number of the plurality of connectors connected to the second nonlinear oscillator being a second number,
the second number being greater than the first number,
in a first period, the controller being configured to perform at least a first operation of supplying a first signal to the first conductive member and supplying a second signal to the second conductive member,
the second direct current component being less than the first direct current component in the case where a first resonant frequency of the first nonlinear oscillator increases when a first direct current component of the first signal is increased and a second resonant frequency of the second nonlinear oscillator increases when a second direct current component of the second signal is increased,
the second direct current component being greater than the first direct current component in the case where the first resonant frequency decreases when the first direct current component is increased and the second resonant frequency decreases when the second direct current component is increased.

Configuration 17

The calculating device according to Configuration 16, wherein the plurality of nonlinear oscillators includes a third nonlinear oscillator, the third nonlinear oscillator includes a third circuit part and a third conductive member, the third circuit part includes a fifth Josephson junction and a sixth Josephson junction, a number of the plurality of connectors connected to the third nonlinear oscillator is a third number, the third number is greater than the second number, the first operation includes supplying a third signal to the third conductive member in the first period, the third direct current component is less than the second direct current component in the case where a third resonant frequency of the third nonlinear oscillator increases when a third direct current component of the third signal is increased, and the third direct current component is greater than the second direct current component in the case where the third resonant frequency decreases when the third direct current component is increased.

Configuration 18

A calculating device, comprising:

a plurality of nonlinear oscillators;

a plurality of connectors, one of the plurality of connectors connecting at least two of the nonlinear oscillators; and a controller, the plurality of nonlinear oscillators including a first nonlinear oscillator and a second nonlinear oscillator, the first nonlinear oscillator including a first circuit part and a first conductive member, the first circuit part including a first Josephson junction and a second Josephson junction, the second nonlinear oscillator including a second circuit part and a second conductive member, the second circuit part including a third Josephson junction and a fourth Josephson junction, a number of the plurality of connectors connected to the first nonlinear oscillator being a first number, a number of the plurality of connectors connected to the second nonlinear oscillator being a second number, the second number being greater than the first number, in a first period, the controller being configured to perform at least a first operation of supplying a first signal to the first conductive member and supplying a second signal to the second conductive member, an amplitude of an alternating current component of the second signal being less than an amplitude of an alternating current component of the first signal.

Configuration 19

The calculating device according to Configuration 18, wherein the plurality of nonlinear oscillators includes a third nonlinear oscillator, the third nonlinear oscillator includes a third circuit part and a third conductive member, the third circuit part includes a fifth Josephson junction and a sixth Josephson junction, a number of the plurality of connectors connected to the third nonlinear oscillator is a third number, the third number is greater than the second number, the first operation includes supplying a third signal to the third conductive member in the first period, and an amplitude of an alternating current component of the third signal is less than the amplitude of the alternating current component of the second signal.

Configuration 20

A calculating device, comprising:

a plurality of nonlinear oscillators; and a plurality of connectors, one of the plurality of connectors connecting at least two of the nonlinear oscillators, the plurality of nonlinear oscillators including a first nonlinear oscillator and a second nonlinear oscillator, the first nonlinear oscillator including a first circuit part and a first conductive member, the first circuit part including a first Josephson junction and a second Josephson junction, the second nonlinear oscillator including a second circuit part and a second conductive member, the second circuit part including a third Josephson junction and a fourth Josephson junction, a number of the plurality of connectors connected to the first nonlinear oscillator being a first number, a number of the plurality of connectors connected to the second nonlinear oscillator being a second number, the second number being greater than the first number, a first surface area of a region surrounded with the first circuit part being different from a second surface area of a region surrounded with the second circuit part, a first resonant frequency of the first nonlinear oscillator being greater than a second resonant frequency of the second nonlinear oscillator.

Configuration 21

The calculating device according to Configuration 20, wherein the plurality of nonlinear oscillators includes a third nonlinear oscillator, the third nonlinear oscillator includes a third circuit part and a third conductive member, the third circuit part includes a fifth Josephson junction and a sixth Josephson junction, a number of the plurality of connectors connected to the third nonlinear oscillator is a third number, the third number is greater than the second number, the second surface area is different from a third surface area of a region surrounded with the third circuit part, and the second resonant frequency is greater than a third resonant frequency of the third nonlinear oscillator.

According to the embodiments, a calculating device can be provided in which the accuracy can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in calculating devices such as nonlinear oscillators, conductive members, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all calculating devices practicable by an appropriate design modification by one skilled in the art based on the calculating devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A calculating device, comprising:
a plurality of nonlinear oscillators;
a plurality of connectors, one of the connectors connecting at least two of the nonlinear oscillators; and
a controller,
the nonlinear oscillators including a first nonlinear oscillator and a second nonlinear oscillator,
the first nonlinear oscillator including a first circuit part and a first conductive member,
the first circuit part including a first Josephson junction and a second Josephson junction,
the second nonlinear oscillator including a second circuit part and a second conductive member,
the second circuit part including a third Josephson junction and a fourth Josephson junction,
a number of the connectors connected to the first nonlinear oscillator being a first number,
a number of the connectors connected to the second nonlinear oscillator being a second number,
the second number being greater than the first number,
in a first period, the controller being configured to perform at least a first operation of supplying a first signal to the first conductive member and supplying a second signal to the second conductive member,
the second signal being different from the first signal,
in the first period, the controller setting the first and second signals to cause an absolute value of $(p_2-\Delta_2)/K_2$ to be less than an absolute value of $(p_1-\Delta_1)/K_1$,
$p_1$ being an amount proportional to an amplitude of an alternating current component of a signal of the first nonlinear oscillator,
$\Delta_1$ being a difference between a resonant frequency of the first nonlinear oscillator and ½ of a frequency of the first signal,
$K_1$ being an anharmonicity of the first nonlinear oscillator,
$p_2$ being an amount proportional to an amplitude of an alternating current component of a signal of the second nonlinear oscillator,
$\Delta_2$ being a difference between a resonant frequency of the second nonlinear oscillator and ½ of a frequency of the second signal,
$K_2$ being an anharmonicity of the second nonlinear oscillator.

2. The device according to claim 1, wherein
$p_1$ is a first pump amplitude of the first nonlinear oscillator,
$\Delta_1$ is a first detuning of the first nonlinear oscillator,
$K_1$ is a first Kerr coefficient of the first nonlinear oscillator,
$p_2$ is a second pump amplitude of the second nonlinear oscillator,
$\Delta_2$ is a second detuning of the second nonlinear oscillator, and
$K_2$ is a second Kerr coefficient of the second nonlinear oscillator.

3. The device according to claim 1, wherein
the nonlinear oscillators includes a third nonlinear oscillator,
the third nonlinear oscillator includes a third circuit part and a third conductive member,
the third circuit part includes a fifth Josephson junction and a sixth Josephson junction,
a number of the connectors connected to the third nonlinear oscillator is a third number,
the third number is greater than the second number,
the first operation includes supplying a third signal to the third conductive member in the first period, and
the third signal is different from the first signal and different from the second signal.

4. The device according to claim 3, wherein
in the first period, the controller sets the first, second, and third signals to cause an absolute value of $(p_2-\Delta_2)/K_2$ to be less than an absolute value of $(p_1-\Delta_1)/K_1$ and to cause an absolute value of $(p_3-\Delta_3)/K_3$ to be less than the absolute value of $(p_2-\Delta_2)/K_2$,
$p_1$ is an amount proportional to an amplitude of an alternating current component of a signal of the first nonlinear oscillator,
$\Delta_1$ is a difference between a resonant frequency of the first nonlinear oscillator and ½ of a frequency of the first signal,
$K_1$ is an anharmonicity of the first nonlinear oscillator,
$p_2$ is an amount proportional to an amplitude of an alternating current component of a signal of the second nonlinear oscillator,
$\Delta_2$ is a difference between a resonant frequency of the second nonlinear oscillator and ½ of a frequency of the second signal,
$K_2$ is an anharmonicity of the second nonlinear oscillator,
$p_3$ is an amount proportional to an amplitude of an alternating current component of a signal of the third nonlinear oscillator,
$\Delta_3$ is a difference between a resonant frequency of the third nonlinear oscillator and ½ of a frequency of the third signal, and
$K_3$ is an anharmonicity of the third nonlinear oscillator.

5. The device according to claim 3, wherein
in the first period, the controller sets the first, second, and third signals to cause an absolute value of $(p_2-\Delta_2)/K_2$ to be less than an absolute value of $(p_1-\Delta_1)/K_1$ and to cause an absolute value of $(p_3-\Delta_3)/K_3$ to be less than the absolute value of $(p_2-\Delta_2)/K_2$,
$p_1$ is a first pump amplitude of the first nonlinear oscillator,
$\Delta_1$ is a first detuning of the first nonlinear oscillator,
$K_1$ is a first Kerr coefficient of the first nonlinear oscillator,
$p_2$ is a second pump amplitude of the second nonlinear oscillator,
$\Delta_2$ is a second detuning of the second nonlinear oscillator,
$K_2$ is a second Kerr coefficient of the second nonlinear oscillator,
$p_3$ is a third pump amplitude of the third nonlinear oscillator,
$\Delta_3$ is a third detuning of the third nonlinear oscillator, and $K_3$ is a third Kerr coefficient of the third nonlinear oscillator.

6. A calculating device, comprising:
a plurality of nonlinear oscillators;
a plurality of connectors, one of the connectors connecting at least two of the nonlinear oscillators; and
a controller,
the nonlinear oscillators including a first nonlinear oscillator and a second nonlinear oscillator,
the first nonlinear oscillator including a first circuit part and a first conductive member,
the first circuit part including a first Josephson junction and a second Josephson junction,
the second nonlinear oscillator including a second circuit part and a second conductive member,
the second circuit part including a third Josephson junction and a fourth Josephson junction,
a number of the connectors connected to the first nonlinear oscillator being a first number,
a number of the connectors connected to the second nonlinear oscillator being a second number,
the second number being greater than the first number,
in a first period, the controller being configured to perform at least a first operation of supplying a first signal to the first conductive member and supplying a second signal to the second conductive member,
the second signal being different from the first signal,
in the first period, the controller controlling the first and second signals to cause an absolute value of a first detuning of the first nonlinear oscillator to be less than an absolute value of a second detuning of the second nonlinear oscillator.

7. The device according to claim 6, wherein
in the first period, the controller controls the first and second signals to cause the first detuning to be a product of the first number and a proportionality coefficient, and to cause the second detuning to be a product of the second number and the proportionality coefficient.

8. The device according to claim 6, wherein
the first detuning is a difference between a resonant frequency of the first nonlinear oscillator and ½ of a frequency of the first signal, and
the second detuning is a difference between a resonant frequency of the second nonlinear oscillator and ½ of a frequency of the second signal.

9. The device according to claim 6, wherein
the first detuning is $(p/K)\gamma C z_1$,
the second detuning is $(p/K)\gamma C z_2$,
p is an average pump amplitude of the first and second nonlinear oscillators,
K is an average Kerr coefficient of the first and second nonlinear oscillators,
$\gamma$ is a coefficient common to the first and second nonlinear oscillators,
C is a coefficient relating to a four-body interaction,
$z_1$ is the first number, and
$z_2$ is the second number.

10. The device according to claim 6, wherein
the nonlinear oscillators includes a third nonlinear oscillator,
the third nonlinear oscillator includes a third circuit part and a third conductive member,
the third circuit part includes a fifth Josephson junction and a sixth Josephson junction,
a number of the connectors connected to the third nonlinear oscillator is a third number, the third number is greater than the second number,
the first operation includes supplying a third signal to the third conductive member in the first period, and
the third signal is different from the first signal and different from the second signal.

11. The device according to claim 10, wherein
in the first period, the controller controls the first, second, and third signals to cause the absolute value of the second detuning to be less than an absolute value of a third detuning of the third nonlinear oscillator.

12. The device according to claim 11, wherein
the controller controls the first, second, and third signals to cause the first detuning to be a product of the first number and a proportionality coefficient, to cause the second detuning to be a product of the second number and the proportionality coefficient, and to cause the third detuning to be a product of the third number and the proportionality coefficient.

13. The device according to claim 12, wherein
the first detuning is a difference between a resonant frequency of the first nonlinear oscillator and ½ of a frequency of the first signal,
the second detuning is a difference between a resonant frequency of the second nonlinear oscillator and ½ of a frequency of the second signal, and
the third detuning is a difference between a resonant frequency of the third nonlinear oscillator and ½ of a frequency of the third signal.

14. A calculating device, comprising:
a plurality of nonlinear oscillators;
a plurality of connectors, one of the connectors connecting at least two of the nonlinear oscillators; and
a controller,
the nonlinear oscillators including a first nonlinear oscillator and a second nonlinear oscillator,
the first nonlinear oscillator including a first circuit part and a first conductive member,
the first circuit part including a first Josephson junction and a second Josephson junction,
the second nonlinear oscillator including a second circuit part and a second conductive member,
the second circuit part including a third Josephson junction and a fourth Josephson junction,
a number of the connectors connected to the first nonlinear oscillator being a first number,
a number of the connectors connected to the second nonlinear oscillator being a second number,
the second number being greater than the first number,
in the first period, the controller being configured to perform at least a first operation of supplying a first signal to the first conductive member and supplying a second signal to the second conductive member,
a frequency of an alternating current component of the second signal being greater than a frequency of an alternating current component of the first signal.

15. The device according to claim 14, wherein
the nonlinear oscillators includes a third nonlinear oscillator,
the third nonlinear oscillator includes a third circuit part and a third conductive member,
the third circuit part includes a fifth Josephson junction and a sixth Josephson junction,
a number of the connectors connected to the third nonlinear oscillator is a third number,
the third number is greater than the second number,
the first operation includes supplying a third signal to the third conductive member in the first period, and a frequency of an alternating current component of the third signal is greater than the frequency of the alternating current component of the second signal.

16. A calculating device, comprising:
a plurality of nonlinear oscillators;
a plurality of connectors, one of the connectors connecting at least two of the nonlinear oscillators; and
a controller,
the nonlinear oscillators including a first nonlinear oscillator and a second nonlinear oscillator,
the first nonlinear oscillator including a first circuit part and a first conductive member,
the first circuit part including a first Josephson junction and a second Josephson junction,
the second nonlinear oscillator including a second circuit part and a second conductive member,
the second circuit part including a third Josephson junction and a fourth Josephson junction,
a number of the connectors connected to the first nonlinear oscillator being a first number,
a number of the connectors connected to the second nonlinear oscillator being a second number,
the second number being greater than the first number,
in a first period, the controller being configured to perform at least a first operation of supplying a first signal to the first conductive member and supplying a second signal to the second conductive member,
the second direct current component being less than the first direct current component in the case where a first resonant frequency of the first nonlinear oscillator increases when a first direct current component of the first signal is increased and a second resonant frequency of the second nonlinear oscillator increases when a second direct current component of the second signal is increased,
the second direct current component being greater than the first direct current component in the case where the first resonant frequency decreases when the first direct current component is increased and the second resonant frequency decreases when the second direct current component is increased.

17. The device according to claim 16, wherein
the nonlinear oscillators includes a third nonlinear oscillator,
the third nonlinear oscillator includes a third circuit part and a third conductive member,
the third circuit part includes a fifth Josephson junction and a sixth Josephson junction,
a number of the connectors connected to the third nonlinear oscillator is a third number,
the third number is greater than the second number,
the first operation includes supplying a third signal to the third conductive member in the first period,
the third direct current component is less than the second direct current component in the case where a third resonant frequency of the third nonlinear oscillator increases when a third direct current component of the third signal is increased, and
the third direct current component is greater than the second direct current component in the case where the third resonant frequency decreases when the third direct current component is increased.

18. A calculating device, comprising:
a plurality of nonlinear oscillators;
a plurality of connectors, one of the connectors connecting at least two of the nonlinear oscillators; and
a controller,
the nonlinear oscillators including a first nonlinear oscillator and a second nonlinear oscillator,
the first nonlinear oscillator including a first circuit part and a first conductive member,
the first circuit part including a first Josephson junction and a second Josephson junction,
the second nonlinear oscillator including a second circuit part and a second conductive member,
the second circuit part including a third Josephson junction and a fourth Josephson junction,
a number of the connectors connected to the first nonlinear oscillator being a first number,
a number of the connectors connected to the second nonlinear oscillator being a second number,
the second number being greater than the first number,
in a first period, the controller being configured to perform at least a first operation of supplying a first signal to the first conductive member and supplying a second signal to the second conductive member,
an amplitude of an alternating current component of the second signal being less than an amplitude of an alternating current component of the first signal.

19. The device according to claim 18, wherein
the nonlinear oscillators includes a third nonlinear oscillator,
the third nonlinear oscillator includes a third circuit part and a third conductive member,
the third circuit part includes a fifth Josephson junction and a sixth Josephson junction,
a number of the connectors connected to the third nonlinear oscillator is a third number,
the third number is greater than the second number,
the first operation includes supplying a third signal to the third conductive member in the first period, and
an amplitude of an alternating current component of the third signal is less than the amplitude of the alternating current component of the second signal.

20. A calculating device, comprising:
a plurality of nonlinear oscillators; and
a plurality of connectors, one of the connectors connecting at least two of the nonlinear oscillators,
the nonlinear oscillators including a first nonlinear oscillator and a second nonlinear oscillator,
the first nonlinear oscillator including a first circuit part and a first conductive member,
the first circuit part including a first Josephson junction and a second Josephson junction,
the second nonlinear oscillator including a second circuit part and a second conductive member,
the second circuit part including a third Josephson junction and a fourth Josephson junction,
a number of the connectors connected to the first nonlinear oscillator being a first number,
a number of the connectors connected to the second nonlinear oscillator being a second number,
the second number being greater than the first number,
a first surface area of a region surrounded with the first circuit part being different from a second surface area of a region surrounded with the second circuit part,
a first resonant frequency of the first nonlinear oscillator being greater than a second resonant frequency of the second nonlinear oscillator.

* * * * *